(12) United States Patent
Higaki et al.

(10) Patent No.: US 8,962,780 B2
(45) Date of Patent: Feb. 24, 2015

(54) POLYCARBONATE-POLYDIORGANO-SILOXANE COPOLYMER

(75) Inventors: Yuji Higaki, Chiyoda-ku (JP); Katsuhiro Yamanaka, Chiyoda-ku (JP); Fumitaka Kondo, Chiyoda-ku (JP)

(73) Assignee: Teijin Chemicals, Ltd., Tokyo (JP)

(*) Notice: Subject to any disclaimer, the term of this patent is extended or adjusted under 35 U.S.C. 154(b) by 432 days.

(21) Appl. No.: 13/386,051

(22) PCT Filed: Jul. 28, 2010

(86) PCT No.: PCT/JP2010/063139
§ 371 (c)(1),
(2), (4) Date: Jan. 20, 2012

(87) PCT Pub. No.: WO2011/013846
PCT Pub. Date: Feb. 3, 2011

(65) Prior Publication Data
US 2012/0271009 A1    Oct. 25, 2012

(30) Foreign Application Priority Data

Jul. 29, 2009  (JP) ................. 2009-176373
Nov. 11, 2009  (JP) ................. 2009-257980
Nov. 11, 2009  (JP) ................. 2009-257981

(51) Int. Cl.
*C08G 64/18* (2006.01)
*C08G 77/448* (2006.01)
*C08L 69/00* (2006.01)
*C08L 83/10* (2006.01)

(52) U.S. Cl.
CPC ............... *C08G 64/186* (2013.01); *C08L 69/00* (2013.01); *C08L 83/10* (2013.01); *C08G 77/448* (2013.01)
USPC ................................. 528/29; 528/25; 525/464

(58) Field of Classification Search
None
See application file for complete search history.

(56) References Cited

U.S. PATENT DOCUMENTS

| | | | |
|---|---|---|---|
| 5,530,083 A * | 6/1996 | Phelps et al. .................. 528/25 |
| 5,783,651 A | 7/1998 | König et al. |
| 6,969,745 B1 | 11/2005 | Taraiya et al. |
| 2001/0039313 A1 * | 11/2001 | Ogawa et al. ................. 525/196 |
| 2004/0220330 A1 * | 11/2004 | DeRudder et al. ............ 524/837 |
| 2005/0187372 A1 | 8/2005 | Venderbosch et al. |
| 2006/0014919 A9 * | 1/2006 | Venderbosch et al. ........ 528/196 |
| 2007/0238846 A1 * | 10/2007 | Davis et al. ................... 528/25 |

FOREIGN PATENT DOCUMENTS

| | | |
|---|---|---|
| EP | 0 500 087 | 8/1992 |
| JP | 3-79626 | 4/1991 |
| JP | 3-292358 | 12/1991 |
| JP | 4-202466 | 7/1992 |
| JP | 5-186675 | 7/1993 |
| JP | 5-247195 | 9/1993 |
| JP | 6-100684 | 4/1994 |
| JP | 6-263865 | 9/1994 |
| JP | 07-258532 | 10/1995 |
| JP | 8-169947 | 7/1996 |
| JP | 9-124795 | 5/1997 |
| JP | 2662310 | 6/1997 |
| JP | 2005-154661 | 6/2005 |
| JP | 2005-535761 | 11/2005 |
| JP | 2006-518803 | 8/2006 |
| JP | 2006-523243 | 10/2006 |
| JP | 2008-505217 | 2/2008 |
| JP | 2008-248262 | 10/2008 |
| JP | 2009-120707 | 6/2009 |
| WO | 91/00885 | 1/1991 |
| WO | 02/47673 | 6/2002 |
| WO | 2004/016674 | 2/2004 |
| WO | 2004/076512 | 9/2004 |
| WO | 2004/076541 | 9/2004 |
| WO | 2006/096196 | 9/2006 |
| WO | 2008/047673 | 4/2008 |

OTHER PUBLICATIONS

Machine translation of JP2009120707; no date.*
Pixton; Strucure to Property Relationships in Polycarbonate/Polydimethylsiloxane Copolymers; ANTEC 2006;p. 2655-2659.*
International Search Report issued Aug. 31, 2010 in International (PCT) Application No. PCT/JP2010/063139, of which the present application is the national stage.
International Preliminary Report on Patentability issued Feb. 16, 2012 in International (PCT) Application No. PCT/JP2010/063139, of which the present application is the national stage.
English language translation of the Office Action issued Apr. 30, 2014 in Japanese Application No. 2009-257980, which was submitted with the IDS of Jun. 24, 2014.
Matthew Pixton et al., "Structure to property relationships in polycarbonate/polydimethylsiloxane copolymers", ANTEC 2006, pp. 2655-2659.

* cited by examiner

*Primary Examiner* — David Buttner
(74) *Attorney, Agent, or Firm* — Wenderoth, Lind & Ponack, L.L.P.

(57) ABSTRACT

It is an object of the present invention to provide a polycarbonate-polydiorganosiloxane copolymer having improved transparency. The present invention is the polycarbonate-polydiorganosiloxane copolymer comprises a polycarbonate block and a polydiorganosiloxane block, wherein (i) the copolymer has an aggregation structure comprising a matrix of the polycarbonate and polydiorganosiloxane domains dispersed therein; (ii) the polydiorganosiloxane domains have an average size of 5 to 40 nm and a normalized dispersity of not more than 30%; and (iii) the total light transmittance is not less than 88%.

9 Claims, 3 Drawing Sheets

POLYCARBONATE-POLYDIORGANO-SILOXANE COPOLYMER

TECHNICAL FIELD

The present invention relates to a polycarbonate-polydiorganosiloxane copolymer having excellent transparency. More specifically, it relates to a polycarbonate-polydiorganosiloxane copolymer which is suitable for use as a molding material or a polymer alloy material, forms a specific aggregation structure and has excellent transparency. Also, the present invention relates to a polycarbonate-polydiorganosiloxane copolymer capable of providing a molded article which is hardly affected by molding conditions and has excellent transparency and flame retardancy.

BACKGROUND ART

Polycarbonates are used for many purposes (such as spectacles lenses and window glass) in which strength, heat resistance and transparency are required as they have excellent impact resistance, a high heat distortion temperature and high transparency. Although polycarbonates which are most widely produced are homopolymers formed by polymerizing bisphenol A (BPA), the development of a polycarbonate which is more excellent in performance is desired along with the expansion of their application. To cope with the expanding application, researches into copolymers obtained by introducing various comonomer units into commonly used monomer raw materials such as BPA are now under way. It is known through the researches into copolymers that a polycarbonate-polydiorganosiloxane copolymer comprising BPA and polydiorganosiloxane is superior to BPA homopolycarbonates in flame retardancy and low-temperature impact resistance (Patent Documents 1 to 3).

However, it is considered that it is difficult to produce a transparent (that is, high total light transmittance and low haze) polycarbonate-polydiorganosiloxane copolymer. The polycarbonate-polydiorganosiloxane copolymer is generally produced by reacting a mixture of a polydiorganosiloxane-containing bisphenol and a dihydric phenol such as BPA with an aqueous acid receptor such as phosgene or a sodium hydroxide aqueous solution under an interfacial condition (Patent Documents 3 to 6). The polycarbonate-polydiorganosiloxane copolymer obtained by this production process is clouded and opaque.

Attempts to produce a transparent polycarbonate-polydiorganosiloxane copolymer are described in Patent Documents 7 to 11. However, the transparency of the polycarbonate-polydiorganosiloxane copolymer obtained by this production process cannot reach a high level which is required for transparent resins.

Meanwhile, Patent Document 12 proposes a resin composition which is obtained by mixing together a first polycarbonate-polydiorganosiloxane copolymer with a second polycarbonate-polydiorganosiloxane copolymer and has polydiorganosiloxane domains having an average domain size of 20 to 45 nm buried in the matrix of a polycarbonate polymer. It is disclosed that this resin composition has impact resistance and a certain level of translucency. More specifically, it is disclosed that this resin composition has translucency (defined as having a light transmittance of about 25 to about 85% and a haze of less than about 104), can achieve an aesthetical visual effect when it is combined with a visual effect additive, is excellent in impact resistance and flame retardancy and has low weld-line visibility. However, this proposal does not disclose the relationship between the average size of the polydiorganosiloxane domains and transparency (light transmittance of not less than 85%).

Further, Patent Document 10 teaches that a polycarbonate-polydiorganosiloxane copolymer which provides a transparent molded article by an ordinary molding technique provides a clouded and opaque molded article when it is molded while it is retained in a high-temperature cylinder. That is, it is known that the transparency of the copolymer is readily affected by molding conditions. This patent document teaches that white turbidity can be suppressed by mixing an acid compound such as phosphorous acid ($H_3PO_3$). However, mixing of phosphorous acid exerts a bad influence such as the corrosion of production equipment on the resin composition and a molded article thereof. Therefore, a polycarbonate-polydiorganosiloxane copolymer which can maintain transparency even under the molding condition that it is retained in a high-temperature cylinder without mixing phosphorous acid has been desired.

To improve the flame retardancy of a polycarbonate resin, a resin dripping phenomenon must be suppressed. In a method in which an aromatic polycarbonate resin having a branched unit is used as a base resin, although transparency is excellent and a dripping improving effect is seen, a polycarbonate resin which is completely satisfactory in terms of both drip preventing effect and fluidity is not obtained yet.

(Patent Document 1) JP-A 5-186675
(Patent Document 2) JP-A 5-247195
(Patent Document 3) JP No. 2662310
(Patent Document 4) JP-A 3-79626
(Patent Document 5) JP-A 4-202466
(Patent Document 6) European Patent No. 0500087
(Patent Document 7) JP-A 6-100684
(Patent Document 8) JP-A 6-263865
(Patent Document 9) JP-A 8-169947
(Patent Document 10) JP-A 2006-518803
(Patent Document 11) JP-A 2005-535761
(Patent Document 12) JP-A 2006-523243
(Patent Document 13) JP-A 07-258532

DISCLOSURE OF THE INVENTION

It is desired that the transparency of the polycarbonate-polydiorganosiloxane copolymer should be improved as described above. A copolymer which is hardly affected by molding conditions and has high transparency stably without mixing an additive which exerts a bad influence like an acid compound such as phosphorous acid is desired.

It is therefore an object of the present invention to provide a polycarbonate-polydiorganosiloxane copolymer which has excellent transparency, is hardly affected by molding conditions and has excellent heat stability as well as a production process thereof. It is another object of the present invention to provide a molded article of a polycarbonate-polydiorganosiloxane copolymer which has excellent transparency, is hardly affected by molding conditions and has excellent heat stability.

It is still another object of the present invention to provide a resin composition which is excellent in transparency, flame retardancy and heat stability as well as a molded article thereof.

The inventors of the present invention have conducted intensive studies to improve the transparency of a polycarbonate-polydiorganosiloxane copolymer and have found that a polycarbonate-polydiorganosiloxane copolymer which forms a specific aggregation structure has especially high transparency. The present invention has been accomplished based on this finding.

That is, according to the present invention, the above objects can be attained by the following constitution.

1. A polycarbonate-polydiorganosiloxane copolymer comprising a polycarbonate block represented by the following formula [1] and a polydiorganosiloxane block represented by the following formula [3], wherein
(i) the copolymer has an aggregation structure comprising a matrix of the polycarbonate and polydiorganosiloxane domains dispersed therein;
(ii) the polydiorganosiloxane domains have an average size of 5 to 40 nm and a normalized dispersity of not more than 30%; and
(iii) the total light transmittance is not less than 88%.

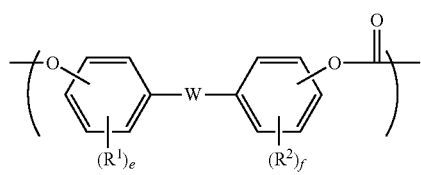

[1]

[in the above formula, $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, with the proviso that when there are a plurality of $R^1$'s and a plurality of $R^2$'s, they may be the same or different, e and f are each an integer of 1 to 4, and W is a single bond or at least one group selected from the group consisting of groups represented by the following formulas [2].

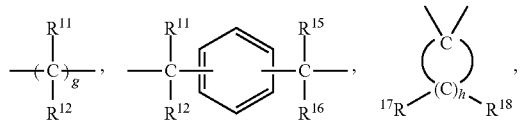

[2]

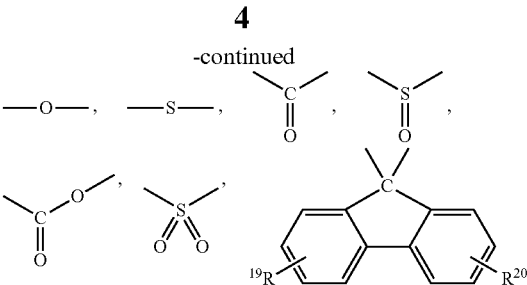

(in the above formulas, $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, with the proviso that when there are a plurality of $R^{19}$'s and a plurality of $R^{20}$'s, they may be the same or different, g is an integer of 1 to 10, and h is an integer of 4 to 7.)]

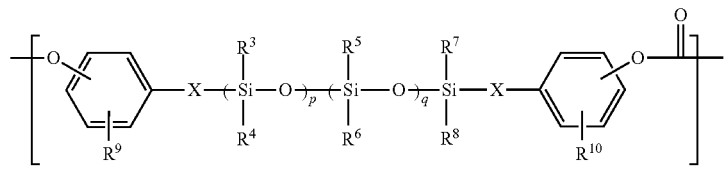

[3]

(in the above formula, $R^3$, $R^4$, $R^5$, $R^6$, $R^7$ and $R^8$ are each independently a hydrogen atom, alkyl group having 1 to 12 carbon atoms, or substituted or non-substituted aryl group having 6 to 12 carbon atoms, $R^9$ and $R^{10}$ are each independently a hydrogen atom, halogen atom, alkyl group having 1 to 10 carbon atoms, or alkoxy group having 1 to 10 carbon atoms, p is a natural number, q is 0 or a natural number, (p+q) is a natural number of less than 100, and X is a divalent aliphatic group having 2 to 8 carbon atoms.)

2. The copolymer in the above paragraph 1, wherein the average size of the polydiorganosiloxane domains is 5 to 15 nm.
3. The copolymer in the above paragraph 1, wherein the polydiorganosiloxane block represented by the formula [3] is derived from a (2-allylphenol)-terminated polydiorganosiloxane or a (2-methoxy-4-allylphenol)-terminated polydiorganosiloxane.
4. The copolymer in the above paragraph 1, wherein (p+q) in the formula [3] is 5 to 70.
5. The copolymer in the above paragraph 1, wherein (p+q) in the formula [3] is 30 to 60 and the total light transmittance is not less than 89%.

6. The copolymer in the above paragraph 1, wherein the content of the polydiorganosiloxane block represented by the formula [3] is 0.1 to 50 wt % based on the total weight of the copolymer.
7. The copolymer in the above paragraph 1, wherein $R^3$, $R^4$, $R^5$, $R^6$, $R^7$ and $R^8$ are all methyl groups.
8. The copolymer in the above paragraph 1 which has a viscosity average molecular weight of $1.60 \times 10^4$ to $2.20 \times 10^4$ and a structural viscosity index (N) of 1.55 to 1.80.
9. The copolymer in the above paragraph 1, wherein the polycarbonate block represented by the formula [1] is derived from 2,2-bis(4-hydroxyphenyl)propane.
10. A molded article formed from the copolymer in the above paragraph 1.
11. The molded article in the above paragraph 10 which has an aggregation structure comprising a matrix of the polycarbonate and polydiorganosiloxane domains dispersed therein, the polydiorganosiloxane domains having an average size of 5 to 40 nm and a normalized dispersity of not more than 30%.
12. The molded article in the above paragraph 10 which has a total light transmittance of not less than 88%.
13. A process of manufacturing the polycarbonate-polydiorganosiloxane copolymer of the above paragraph 1, comprising the steps of:
(1) reacting a dihydric phenol (I) represented by the following formula [4] with phosgene in a mixed solution of a water-insoluble organic solvent and an alkaline aqueous solution to prepare a solution containing a carbonate oligomer having a terminal chloroformate group:

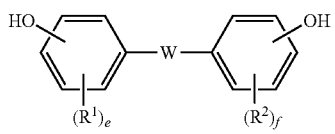

[4]

($R^1$, $R^2$, e, f and W are as defined above.)
(ii) adding a hydroxyaryl-terminated polydiorganosiloxane (II) represented by the following formula [5] at a rate of not more than 0.01 mole/min based on 1 mole of the dihydric phenol (I) charged to prepare the solution while the solution is stirred to carry out the interfacial polycondensation of the hydroxyaryl-terminated polydiorganosiloxane (II) and the carbonate oligomer:

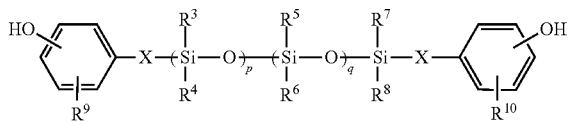

[5]

($R^3$, $R^4$, $R^5$, $R^6$, $R^7$, $R^8$, $R^9$, $R^{10}$, p, q and X are as defined above.).
14. The production process in the above paragraph 13, wherein the water-insoluble organic solvent is used in an amount of not less than 12 moles based on 1 mole of the dihydric phenol (I) represented by the formula [4].
15. A resin composition comprising 5 to 95 wt % of an aromatic polycarbonate and 95 to 5 wt % of the polycarbonate-polydiorganosiloxane copolymer of the above paragraph 1, wherein (i) the resin composition has an aggregation structure comprising a matrix of the polycarbonate and polydiorganosiloxane domains dispersed therein;
(ii) the polydiorganosiloxane domains have an average size of 5 to 40 nm and a normalized dispersity of not more than 30%; and
(iii) the total light transmittance is not less than 88%.
16. A molded article formed from the resin composition of the above paragraph 15.

BRIEF DESCRIPTION OF THE DRAWINGS

FIG. 1 are graphs showing a small angle X-ray scattering profile and analytical results of a 1.0 mm-thick portion of a triple plate measured in Example 1, wherein FIG. 1(a) is a graph of the measured scattering profile (measurement data) and FIG. 1(b) is a graph of a particle size distribution analyzed therefrom.

FIG. 2 are graphs showing a small angle X-ray scattering profile and analytical results of a 1.0 mm-thick portion of a triple plate measured in Comparative Example 1, wherein FIG. 2(a) is a graph of the measured scattering profile (measurement data) and FIG. 2(b) is a graph of a particle size distribution analyzed therefrom.

FIG. 5 are graphs showing a small angle X-ray scattering profile and analytical results of a 1.0 mm-thick portion of a triple plate measured in Example 14, wherein FIG. 5(a) is a graph of the measured scattering profile (measurement data) and FIG. 5(b) is a graph of a particle size distribution analyzed therefrom.

FIG. 6 are graphs showing a small angle X-ray scattering profile and analytical results of a 1.0 mm-thick portion of a triple plate measured in Comparative Example 5, wherein FIG. 6(a) is a graph of the measured scattering profile (measurement data) and FIG. 6(b) is a graph of a particle size distribution analyzed therefrom.

BEST MODE FOR CARRYING OUT THE INVENTION

Figure 1:
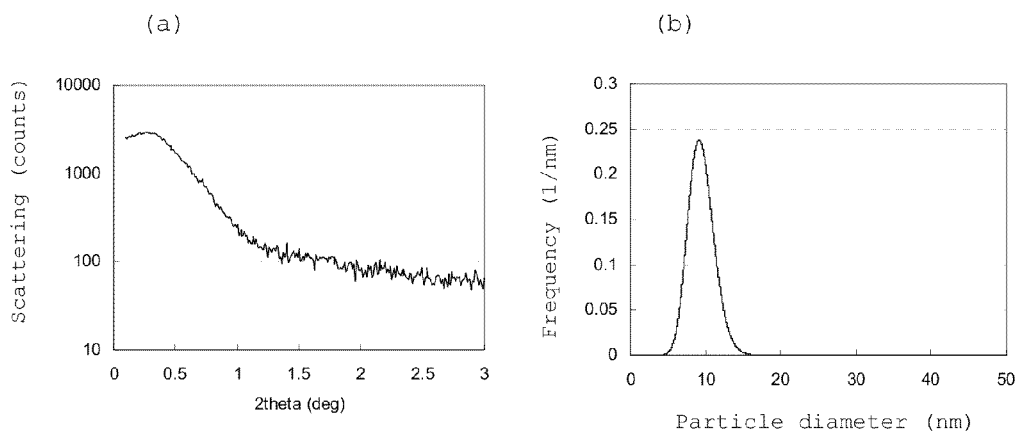

The present invention will be described in detail hereinunder.

[Polycarbonate-Polydiorganosiloxane Copolymer]

The polycarbonate-polydiorganosiloxane copolymer (may be simply referred to as "copolymer" hereinafter) of the present invention comprises a polycarbonate block of the formula [1] and a polydiorganosiloxane block of the formula [3].

(Polycarbonate Block of Formula [1])

The polycarbonate block is represented by the following formula [1].

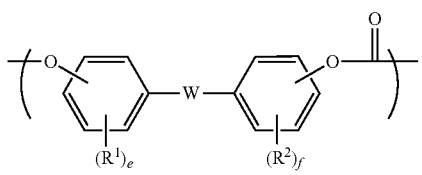

[1]

In the formula [1], $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group. When there are a plurality of $R^1$'s and a plurality of $R^2$'s, they may be the same or different.

Examples of the halogen atom include fluorine atom, chlorine atom and bromine atom. Examples of the alkyl group having 1 to 18 carbon atoms include methyl group, ethyl group, propyl group, butyl group, pentyl group, hexyl group, heptyl group, octyl group, nonyl group, decyl group, dodecyl group and tetradecyl group. It is preferably an alkyl group having 1 to 6 carbon atoms. Examples of the alkoxy group having 1 to 18 carbon atoms include methoxy group, ethoxy group, propoxy group, butoxy group, pentoxy group, hextoxy group and octoxy group. It is preferably an alkyl group having 1 to 6 carbon atoms.

Examples of the cycloalkyl group having 6 to 20 carbon atoms include cyclohexyl group and cyclooctyl group. It is preferably a cycloalkyl group having 6 to 12 carbon atoms. Preferred examples of the cycloalkoxy group having 6 to 20 carbon atoms include cyclohexyloxy group and cyclooctyloxy group. It is preferably a cycloalkyl group having 6 to 12 carbon atoms.

Examples of the alkenyl group having 2 to 10 carbon atoms include methenyl group, ethenyl group, propenyl group, butenyl group and pentenyl group. It is preferably an alkyl group having 1 to 6 carbon atoms.

Examples of the aryl group having 3 to 14 carbon atoms include phenyl group and naphthyl group. Examples of the aryloxy group having 3 to 14 carbon atoms include phenyloxy group and naphthyloxy group. Examples of the aralkyl group having 7 to 20 carbon atoms include benzyl group and phenylethyl group. Examples of the aralkyloxy group having 7 to 20 carbon atoms include benzyloxy group and phenylethyloxy group.

"e" and "f" are each an integer of 1 to 4.

W is a single bond or at least one group selected from the group consisting of groups represented by the following formulas [2].

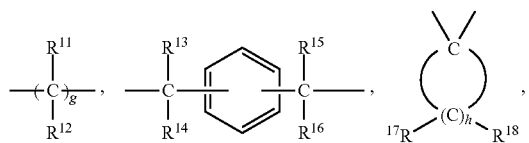

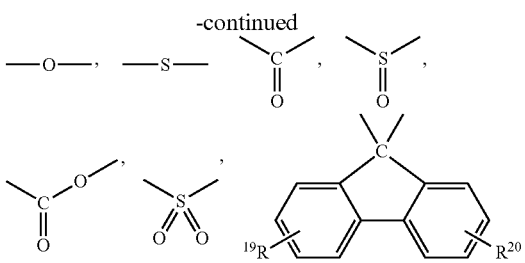

[2]

In the above formulas [2], $R^{11}, R^{12}, R^{13}, R^{14}, R^{15}, R^{16}, R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms.

Examples of the alkyl group having 1 to 18 carbon atoms include methyl group, ethyl group, propyl group, butyl group, pentyl group, hexyl group, heptyl group, octyl group, nonyl group, decyl group and dodecyl group. It is preferably an alkyl group having 1 to 6 carbon atoms.

Examples of the aryl group having 3 to 14 carbon atoms include phenyl group and naphthyl group. They may be substituted. Examples of the substituent include alkyl groups having 1 to 6 carbon atoms such as methyl group, ethyl group, propyl group and butyl group. Examples of the aralkyl group having 7 to 20 carbon atoms include benzyl group and phenylethyl group.

$R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group. When there are a plurality of $R^{19}$'s and a plurality of $R^{20}$'s, they may be the same or different.

Examples of the halogen atom include fluorine atom, chlorine atom and bromine atom. Examples of the alkyl group having 1 to 18 carbon atoms include methyl group, ethyl group, propyl group, butyl group, pentyl group, hexyl group, heptyl group, octyl group, nonyl group, decyl group, dodecyl group and tetradecyl group. It is preferably an alkyl group having 1 to 6 carbon atoms. Examples of the alkoxy group having 1 to 10 carbon atoms include methoxy group, ethoxy group, propoxy group, butoxy group and pentoxy group. It is preferably an alkyl group having 1 to 6 carbon atoms.

Examples of the cycloalkyl group having 6 to 20 carbon atoms include cyclohexyl group and cyclooctyl group. It is preferably a cycloalkyl group having 6 to 12 carbon atoms. Examples of the cycloalkoxy group having 6 to 20 carbon atoms include cyclohexyloxy group and cyclooctyloxy group. It is preferably a cycloalkyl group having 6 to 12 carbon atoms.

Examples of the alkenyl group having 2 to 10 carbon atoms include methenyl group, ethenyl group, propenyl group, butenyl group and pentenyl group. It is preferably an alkyl group having 1 to 6 carbon atoms.

Examples of the aryl group having 3 to 14 carbon atoms include phenyl group and naphthyl group. Examples of the aryloxy group having 3 to 14 carbon atoms include phenyloxy group and naphthyloxy group. Examples of the aralkyl group having 7 to 20 carbon atoms include benzyl group and phenylethyl group. Examples of the aralkyloxy group having 7 to 20 carbon atoms include benzyloxy group and phenylethyloxy group.

"g" is an integer of 1 to 10, preferably 1 to 6. "h" is an integer of 4 to 7, preferably 4 to 5.

The polycarbonate block represented by the formula [1] is preferably a block derived from 2,2-bis(4-hydroxyphenyl) propane.

As for the length of the polycarbonate block, the average number of the recurring units of the formula [1] is preferably 10 to 100, more preferably 30 to 80, much more preferably 35 to 65.

The content of the polycarbonate block represented by the formula [1] is preferably 50 to 99.9 wt %, more preferably 70 to 99.5 wt %, much more preferably 80 to 99.0 wt % based on the total weight of the copolymer.

(Polydiorganosiloxane Block of Formula [3])

The polydiorganosiloxane block is represented by the following formula [3].

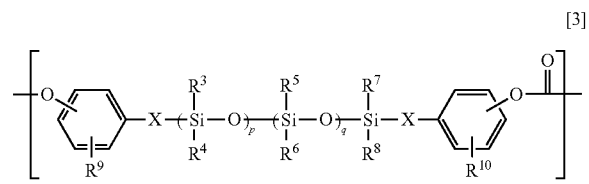

[3]

In the above formula [3], $R^3$, $R^4$, $R^5$, $R^6$, $R^7$ and $R^8$ are each independently a hydrogen atom, alkyl group having 1 to 12 carbon atoms, or substituted or non-substituted aryl group having 6 to 12 carbon atoms.

Examples of the alkyl group having 1 to 12 carbon atoms include methyl group, ethyl group, propyl group, butyl group, pentyl group, hexyl group, heptyl group, octyl group, nonyl group, decyl group and dodecyl group. It is preferably an alkyl group having 1 to 6 carbon atoms. Examples of the substituted or non-substituted aryl group having 6 to 12 carbon atoms include phenyl group and naphthyl group. Examples of the substituent include alkyl groups having 1 to 12 carbon atoms such as methyl group, ethyl group, propyl group, butyl group, pentyl group and hexyl group. $R^3$, $R^4$, $R^5$, $R^6$, $R^7$ and $R^8$ are preferably methyl groups.

$R^9$ and $R^{10}$ are each independently a hydrogen atom, halogen atom, alkyl group having 1 to 10 carbon atoms, or alkoxy group having 1 to 10 carbon atoms.

Examples of the halogen atom include fluorine atom, chlorine atom and bromine atom. Examples of the alkyl group having 1 to 10 carbon atoms include methyl group, ethyl group, propyl group, butyl group, pentyl group, hexyl group, heptyl group, octyl group, nonyl group, decyl group and dodecyl group. It is preferably an alkyl group having 1 to 6 carbon atoms. Examples of the alkoxy group having 1 to 10 carbon atoms include methoxy group, ethoxy group, propoxy group, butoxy group, pentoxy group, hexoxy group, heptoxy group and octoxy group. It is preferably an alkylkoxy group having 1 to 6 carbon atoms.

"p" is a natural number, "q" is 0 or a natural number, and (p+q) is a natural number of less than 100. "p" is preferably 5 to 100, more preferably 30 to 60. "q" is preferably 0 to 80, more preferably 0 to 50. (p+q) is preferably 5 to 70, more preferably 30 to 60, particularly preferably 30 to 50.

X is a divalent aliphatic group having 2 to 8 carbon atoms. An example of the divalent aliphatic group is an alkylene group having 2 to 8 carbon atoms. Examples of the alkylene group include ethylene group, trimethylene group and tetramethylene group.

The polydiorganosiloxane block represented by the formula [3] is preferably a block derived from a (2-allylphenol)-terminated polydiorganosiloxane or a (2-methoxy-4-allylphenol)-terminated polydiorganosiloxane. That is, preferably, X is a trimethylene group and $R^9$ and $R^{10}$ are both hydrogen atoms, or X is a trimethylene group and $R^9$ and $R^{10}$ are both methoxy groups in the formula [3].

The content of the polydiorganosiloxane block represented by the formula [3] is preferably 0.1 to 50 wt %, more preferably 0.5 to 30 wt %, much more preferably 1.0 to 20 wt % based on the total weight of the copolymer.

The viscosity average molecular weight of the copolymer is preferably $5.0 \times 10^3$ to $5.0 \times 10^4$, more preferably $1.0 \times 10^4$ to $4.0 \times 10^4$, much more preferably $1.5 \times 10^4$ to $3.5 \times 10^4$, particularly preferably $1.7 \times 10^4$ to $2.5 \times 10^4$. When the viscosity average molecular weight of the copolymer is lower than $5.0 \times 10^3$, a practical level of mechanical strength is hardly obtained in many fields. When the viscosity average molecular weight is higher than $5.0 \times 10^4$, melt viscosity becomes high and therefore a high molding temperature is required with the result that inconvenience such as the thermal deterioration of the resin readily occurs.

(Average Size and Normalized Dispersity of Polydiorganosiloxane Domains)

The copolymer of the present invention has an aggregation structure comprising a matrix of a polycarbonate polymer and polydiorganosiloxane domains dispersed therein.

The polydiorganosiloxane domains in the present invention are domains which comprise polydiorganosiloxane as the main component dispersed in the matrix of the polycarbonate and may comprise another component. Since the polydiorganosiloxane domains are formed by phase separation from the polycarbonate as the matrix as described above, they are not always composed of a single component.

The content of the polydiorganosiloxane is preferably 0.1 to 50 wt % based on the total weight of the copolymer. The content of the polydiorganosiloxane component is more preferably 0.5 to 30 wt %, much more preferably 1 to 20 wt %. When the content is higher than the lower limit of the preferred range, excellent impact resistance and flame retardancy are obtained and when the content is lower than the upper limit of the preferred range, stable transparency which is hardly affected by molding conditions is readily obtained. The polymerization degree of the diorganosiloxane and the content of the polydiorganosiloxane can be calculated by $^1$H-NMR measurement.

The average size of the polydiorganosiloxane domains is 5 to 40 nm, preferably 5 to 15 nm, more preferably 7 to 12 nm.

The lower limit of the average size is preferably 6 nm, more preferably 7 nm. The upper limit of the average size is preferably 20 nm, more preferably 15 nm, particularly preferably 12 nm. Below the lower limit of the above range, impact resistance and flame retardancy are not fully obtained and above the upper limit of the above range, transparency is not obtained stably.

The polydiorganosiloxane domains of the copolymer of the present invention have a normalized dispersity of not more than 30%.

If the average size of the polydiorganosiloxane domains falls within the above preferred range, when the normalized dispersity of the polydiorganosiloxane domains exceeds 30%, high and stable transparency is not obtained. The normalized dispersity of the polydiorganosiloxane domains is preferably not more than 25%, more preferably not more than 20%. The lower limit of the normalized dispersity is preferably not less than 7%, more preferably not less than 10%. When the domains have the above suitable average size and normalized dispersity, there are provided a copolymer and a molded articled thereof both of which have transparency and impact resistance as well as flame retardancy.

The average domain size and normalized dispersity of the polydiorganosiloxane domains of the copolymer molded article of the present invention are evaluated by a small angle X-ray scattering (SAXS) method. The small angle X-ray scattering method is a method for measuring diffuse scattering and diffraction which occur in a small-angle area having a scattering angle ($2\theta$) of less than 10°. In this small angle X-ray scattering method, when there are areas as large as 1 to 100 nm which differ in electron density in a substance, the diffuse scattering of X-ray due to the difference in electron density is measured. The particle diameter of an object to be measured is obtained based on this scattering angle and the scattering intensity. In the case of a copolymer having an aggregation structure comprising a matrix of a polycarbonate and polydiorganosiloxane domains dispersed therein, the diffuse scattering of X-ray occurs due to the difference in electron density between the polycarbonate matrix and the polydiorganosiloxane domains. A small-angle X-ray scattering profile is obtained by measuring the scattering intensity I at each scattering angle ($2\theta$) of less than 10°, and simulation is carried out by using commercially available analytical software to obtain the average size and particle size distribution (normalized dispersity) of the polydiorganosiloxane domains from a provisional particle diameter and a provisional particle size distribution model based on the assumption that the polydiorganosiloxane domains are spherical domains and there exist variations in particle size distribution. According to the small angle X-ray scattering method, the average size and particle size distribution of the polydiorganosiloxane domains dispersed in the matrix of the polycarbonate polymer which cannot be measured accurately by observation through a transmission electron microscope can be measured accurately and easily with high reproducibility.

The term "average domain size" means the number average of domain sizes. The term "normalized dispersity" means a parameter obtained by normalizing the expanse of a particle size distribution with the average size. More specifically, it is a value obtained by normalizing the dispersity of the polydiorganosiloxane domain sizes with the average domain size and represented by the following equation (1).

$$\text{Normalized dispersity (\%)} = \delta/D_{av} \quad (1)$$

In the above equation (1), $\sigma$ is the standard deviation of polydiorganosiloxane domain sizes, and $D_{av}$ is an average domain size.

The terms "average domain size" and "normalized dispersity" used in association with the present invention are measurement values obtained by measuring a 1.0 mm-thick molded article formed by injection molding in accordance with the small angle X-ray scattering method. More specifically, a triple plate (having a width of 50 mm, a length of 90 mm, a thickness of 3.0 mm (length of 20 mm), 2.0 mm (length of 45 mm) and 1.0 mm (length of 25 mm) from the gate side and an arithmetic average surface roughness (Ra) of 0.03 μm) formed by injection molding is used to measure the average size and particle size distribution (normalized dispersity) of polydiorganosiloxane domains at an intersection which is 5 mm away from the end of a 1.0 mm-thick portion and 5 mm away from the side portion by the small angle X-ray scattering method.

(Total Light Transmittance)

The copolymer of the present invention has a total light transmittance of not less than 88%. The total light transmittance of a 2.0 mm-thick molded article formed by injection molding the copolymer of the present invention is not less than 88%. The total light transmittance is preferably not less than 88.5%, more preferably not less than 89%. The upper limit of the total light transmittance is preferably 92%, more preferably 91.5%. The 2.0 mm-thick molded article of the copolymer of the present invention preferably has a haze of 0.3 to 20%. The haze is more preferably 0.5 to 10%, much more preferably 0.6 to 5%, particularly preferably 0.7 to 2%.

The total light transmittance indicates the level of transparency and means the ratio of transmitted light to incident light measured by the method E308 of ASTM-D1003-61. The term "haze" used in association with the present invention indicates the level of transparency and means the percentage of transmitted light deviated from an incident light flux by forward scattering when it passes through a test specimen (ASTM-D1003-61). That is, as the total light transmittance becomes higher and the haze becomes lower, transparency becomes higher.

[Flame Retardancy]

$$D = a\sigma^N$$

In the above equation, D is shearing speed (1/sec), "a" is a constant, "$\sigma$" is shear stress (Pa), and N is a structural viscosity index. This structural viscosity index (N) is measured based on ISO11443.

The structural viscosity index (N) becomes an index of the flowability of a resin at the time of molding and may also become an index of drip prevention ability at the time of combustion. When N is 1, the resin exhibits Newtonian flowability, and as N becomes larger, the non-Newtonian flowability becomes higher. When this structural viscosity index is high, the resin has high viscosity in a molten state, whereby it hardly drips at the time of combustion and when the shearing speed becomes high, the viscosity lowers, whereby moldability becomes high.

The polycarbonate-polydiorganosiloxane copolymer of the present invention preferably has an N of 1.55 to 1.80. A copolymer having an N of not less than 1.55 exhibits such high flame retardancy that dripping which makes a fire is suppressed at the time of combustion, and a copolymer having an N of not more than 1.80 has low shear viscosity and excellent moldability advantageously. The structural viscosity index N is more preferably 1.60 to 1.80, much more preferably 1.62 to 1.78.

The polycarbonate-polydiorganosiloxane copolymer exhibits flame retardancy and moldability effectively by adjusting its structural viscosity index when its viscosity average molecular weight, the polymerization degree of polydiorganosiloxane and the content of polydiorganosiloxane fall within respective specific ranges.

In general, as the viscosity average molecular weight (Mv) of a resin becomes higher, its structural viscosity index becomes higher. However, as the viscosity average molecular weight of an aromatic polycarbonate resin becomes higher, its flowability becomes lower. Therefore, the viscosity average molecular weight of the polycarbonate-polydiorganosiloxane copolymer of the present invention is preferably $1.60 \times 10^4$ to $2.20 \times 10^4$, more preferably $1.70 \times 10^4$ to $2.10 \times 10^4$, much more preferably $1.8 \times 10^4$ to $2.05 \times 10^4$. When the viscosity average molecular weight of the polycarbonate-polydiorganosiloxane copolymer is above the lower limit of the above preferred range, it achieves mechanical strength for practical application in many fields, and when the viscosity average molecular weight is below the upper limit, its shear viscosity is low at a high shearing speed, which is preferred for molding techniques, especially injection molding.

[Production Process of Copolymer]

The polycarbonate-polydiorganosiloxane copolymer can be produced through the steps (i) and (ii).

(Step (i))

The step (i) is the step of reacting a dihydric phenol (I) represented by the following formula [4] with phosgene in a mixed solution of a water-insoluble organic solvent and an alkaline aqueous solution to prepare a solution containing a carbonate oligomer having a terminal chloroformate group.

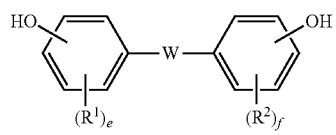

[4]

(in the above formula, $R^1$, $R^2$, e, f and W are as defined above.)

Examples of the dihydric phenol (I) represented by the above formula [4] include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyl diphenol, 4,4'-dihydroxydiphenyl sulfoxide, 4,4'-dihydroxydiphenyl sulfide, 2,2'-dimethyl-4,4'-sulfonyl diphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanedyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyl diphenol, 9,9-bis(4-hydroxy-3-methylphenyl)fluorene, 1,3-bis{2-(4-hydroxyphenyl)propyl}benzene and 1,4-bis{2-(4-hydroxyphenyl) propyl}benzene are preferred.

2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. 2,2-bis(4-hydroxyphenyl)propane having high strength and high durability is most preferred. They may be used alone or in combination of two or more.

In the step (i), a solution containing an oligomer having a terminal chloroformate group which is a carbonate oligomer of the dihydric phenol (I) is prepared through a reaction between the dihydric phenol (I) and phosgene or a chloroformate forming compound such as chloroformate of the dihydric phenol (I) in a mixed solution of a water-insoluble organic solvent and an alkaline aqueous solution.

The polymerization degree of the carbonate oligomer is preferably 1.0 to 10.0, more preferably 2.0 to 8.0, much more preferably 1.5 to 4.0.

The solution contains a chloroformate compound of the dihydric phenol (I) which is not polymerized (polymerization degree=1).

To form a chloroformate compound from the dihydric phenol (I), the whole amount of the dihydric phenol (I) may be used at a time to form the chloroformate compound, or part of the dihydric phenol (I) may be added as a post-addition monomer to the subsequent interfacial polycondensation reaction as a reaction raw material. The post-addition monomer is added to accelerate the subsequent polycondensation reaction and does not need to be added when not required.

This chloroformate oligomer forming reaction method is not particularly limited but preferably carried out in a solvent in the presence of an acid binder. A small amount of an antioxidant such as sodium phosphite or hydrosulfide may be further added as required and is preferably added.

Phosgene is preferred as the chloroformate forming compound. The amount of the chloroformate forming compound may be suitably adjusted in consideration of the stoichiometric proportion (equivalent) of the reaction. When phosgene which is a preferred chloroformate forming compound is used, gasified phosgene is preferably blown into the reaction system.

As the above acid binder may be used an alkali metal hydroxide such as sodium hydroxide or potassium hydroxide, an alkali metal carbonate such as sodium carbonate or potassium carbonate, an organic base such as pyridine, or a mixture thereof.

The amount of the acid binder may also be suitably determined in consideration of the stoichiometric proportion (equivalent) of the reaction. More specifically, 2 equivalents or a little more of the acid binder is preferably used based on 1 mole (generally, 1 mole is equivalent to 2 equivalents) of the dihydric phenol (I) used to form the chloroformate compound of the dihydric phenol (I).

As the above solvent, various solvents which are inactive to the reaction and used to produce known polycarbonates may be used alone or as a mixture. Typical examples thereof include hydrocarbon solvents such as xylene and halogenated hydrocarbon solvents such as methylene chloride and chlorobenzene. Halogenated hydrocarbon solvents such as methylene chloride are particularly preferably used. In order to improve the transparency of the obtained polycarbonate-polydiorganosiloxane copolymer, it is effective to reduce the solid content concentration. The concentration of the dihydric phenol (I) is preferably not more than 400 g/L, more preferably not more than 300 g/L, much more preferably not more than 250 g/L. Although the concentration of the dihydric phenol (I) is preferably as lower as possible from the viewpoint of stable transparency, the lower limit thereof is preferably not less than 100 g/L from the viewpoint of production efficiency.

The amount of the water-insoluble organic solvent is preferably not less than 8 moles, more preferably not less than 10 moles, much more preferably not less than 12 moles, particularly preferably not less than 14 moles based on 1 mole of the dihydric phenol (I). Although the upper limit of the amount is not particularly limited, not more than 50 moles suffices from the viewpoints of the size of the equipment and cost. By setting the molar ratio of the organic solvent to the dihydric phenol (I) to the above range, the average size and normalized dispersity of the polydiorganosiloxane domains are easily controlled to appropriate values. As a result, even a copolymer comprising a hydroxyaryl-terminated polydiorganosiloxane (II) having a high siloxane polymerization degree (p+q>30) can provide a polycarbonate-polydiorganosiloxane copolymer which has a high total light transmittance stably and a low haze. Further, the copolymer can provide a molded article whose transparency is rarely affected by molding conditions and which has high transparency stably.

The pressure in the chloroformate compound forming reaction is not particularly limited and may be normal, increased or reduced pressure. In general, it is advantageous that the reaction should be carried out under normal pressure. The reaction temperature is selected from a range of −20 to 50° C. Since heat is generated by the reaction in many cases, water cooling or ice cooling is desirably carried out. The reaction time is affected by other conditions and cannot be specified unconditionally but generally 0.2 to 10 hours. The pH range in the chloroformate compound forming reaction can be set by making use of known interfacial reaction conditions and is generally adjusted to not less than 10.

(Step (ii))

The step (ii) is the step of adding a hydroxyaryl-terminated polydiorganosiloxane (II) represented by the following formula [5] at a rate of not more than 0.01 mole/min based on 1 mole of the dihydric phenol (I) charged to prepare the solution obtained in the step (i) while the solution is stirred to carry out the interfacial polycondensation of the hydroxyaryl-terminated polydiorganosiloxane (II) and the carbonate oligomer.

[5]

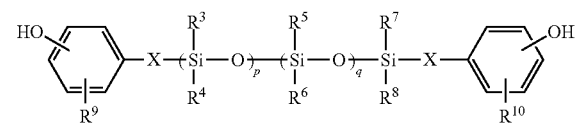

(in the above formula, $R^3$, $R^4$, $R^5$, $R^6$, $R^7$, $R^8$, $R^9$, $R^{10}$, p, q and X are as defined above.)

As the hydroxyaryl-terminated polydiorganosiloxane (II) represented by the above formula [5], the following compounds are preferably used.

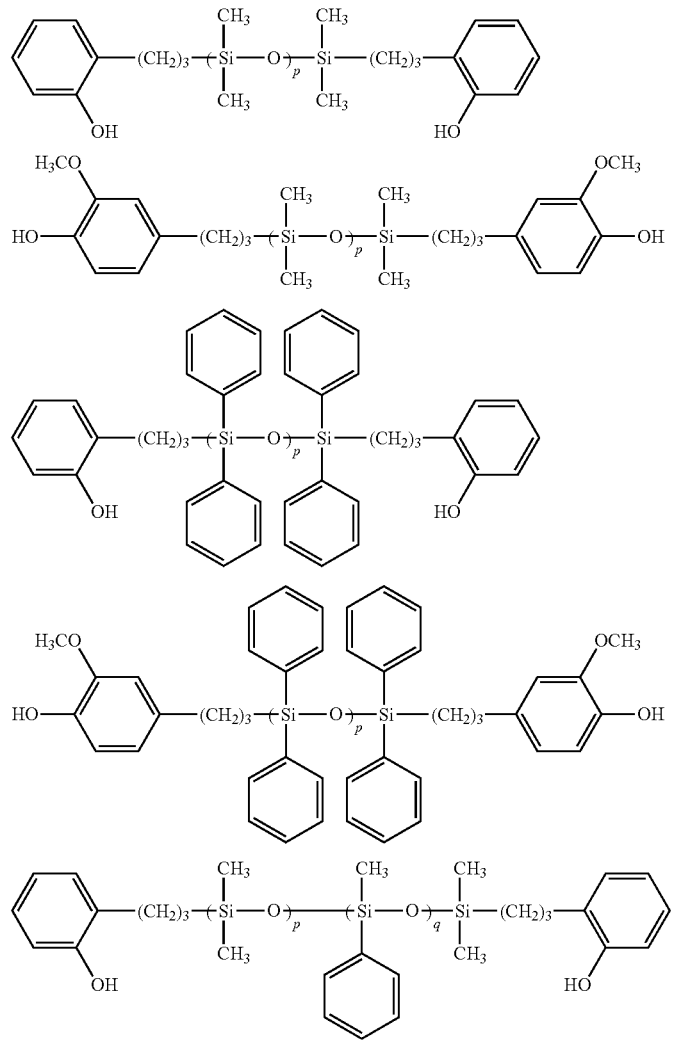

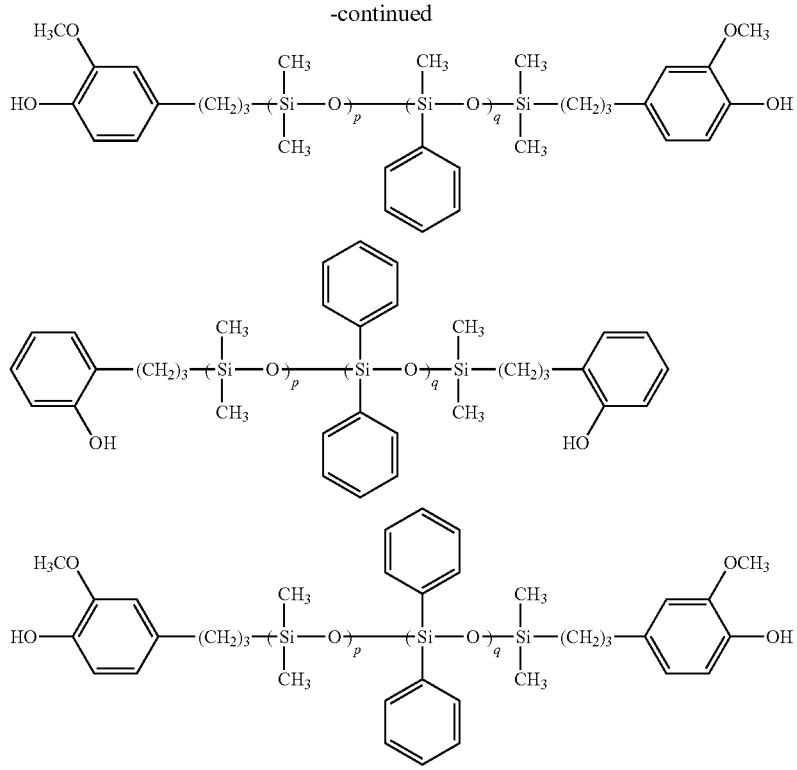

-continued

The hydroxylaryl-terminated polydiorganosiloxane (II) is easily produced by hydrosilylation reacting a phenol having an olefinically unsaturated carbon-carbon bond, preferably vinyl phenol, 2-allylphenol, isopropenyl phenol or 2-methoxy-4-allylphenol with a terminal of a polysiloxane chain having a predetermined degree of polymerization. Out of these, (2-allyphenol)-terminated polydiorganosiloxanes and (2-methoxy-4-allylphenol)-terminated polydiorganosiloxanes are preferred, and (2-allylphenol)-terminated polydimethylsiloxane and (2-methoxy-4-allyphenol)-terminated polydimethylsiloxane are particularly preferred.

To obtain high transparency, the diorganosiloxane polymerization degree (p+q) of the hydroxyaryl-terminated polydiorganosiloxane (II) is suitably less than 100. The diorganosiloxane polymerization degree (p+q) is preferably 5 to 70, more preferably 20 to 60, much more preferably 30 to 60, particularly preferably 30 to 50. Above the lower limit of the above preferred range, impact resistance and flame retardancy become excellent, and below the upper limit of the preferred range, transparency becomes excellent. That is, a copolymer having a diorganosiloxane polymerization degree below the upper limit can easily reduce the average size and normalized dispersity of the polydiorganosiloxane domains. As a result, a resin molded article having excellent transparency can be obtained even when the copolymer is molded under the condition that it is retained in the cylinder at a high temperature for a long time. The number of moles based on unit weight of a polydiorganosiloxane unit which has a polymerization degree below the above upper limit increases, whereby the unit is easily uniformly incorporated into the polycarbonate. When the diorganosiloxane polymerization degree is high, the incorporation of the polydiorganosiloxane unit into the polycarbonate becomes nonuniform and the content of the polydiorganosiloxane unit in the polymer molecule increases. Therefore, a polycarbonate containing the unit and a polycarbonate containing none of the unit are readily formed, and compatibility between them tends to lower. As a result, large polydiorganosiloxane domains are readily formed. Meanwhile, since it is advantageous that the polydiorganosiloxane domains are large to some extent from the viewpoints of impact resistance and flame retardancy, the above preferred range of the polymerization degree exists.

The hydroxyaryl-terminated polydiorganosiloxanes (II) may be used alone or in combination of two or more. As long as the production process of the present invention is not impeded, another comonomer other than the above dihydric phenol (I) and the hydroxyaryl-terminated polydiorganosiloxane (II) may be used in an amount of not more than 10 wt % based on the total weight of the copolymer.

In the present invention, after the solution containing the carbonate oligomer of the dihydric phenol (I) having a terminal chloroformate group is prepared in the step (i), the hydroxyaryl-terminated polydiorganosiloxane (II) represented by the above formula [5] is added at a rate of not more than 0.01 mole/min based on 1 mole of the dihydric phenol (I) charged to prepare the above mixed solution while the solution is stirred to carry out the interfacial polycondensation of the hydroxyaryl-terminated polydiorganosiloxane (II) and the chloroformate compound so as to obtain a polycarbonate-polydiorganosiloxane copolymer in the step (ii).

Although the present invention is not limited by any theory, the reason that the predetermined domain sizes and the normalized dispersity of the domain sizes can be reduced by the process is assumed as follows.

In the prior art process, as phosgene is reacted with a mixture of the dihydric phenol (I) and the hydroxyaryl-terminated polydiorganosiloxane (II), a block copolymer having a long chain composed of only one of the monomers is readily formed due to the difference in reactivity between the dihydric phenol (II) and the hydroxyaryl-terminated polydiorganosiloxane (II). Further, a structure in which the hydroxyaryl-terminated polydiorganosiloxane (II) is bonded through a short-chain carbonate oligomer composed of the dihydric phenol (I) is readily formed.

Meanwhile, the process of the present invention makes it possible to suppress a rapid increase in the concentration of the hydroxyaryl-terminated polydiorganosiloxane (II), thereby promoting the reaction between the monomer and the carbonate oligomer of the dihydric phenol (I) having a terminal chloroformate group steadily to reduce the amount of unreacted hydroxyaryl-terminated polydiorganosiloxane (II). It is considered that this reduction eliminates the difference in reactivity between the dihydric phenol (I) and the hydroxyaryl-terminated polydiorganosiloxane (II) and decreases the probability of forming the block copolymer having a long chain composed of only one of the monomers and the structure in which the hydroxyaryl-terminated polydiorganosiloxane (II) is bonded through the short-chain carbonate oligomer composed of the dihydric phenol (I). It is presumed that a copolymer having an aggregation structure with a small normalized dispersity of polydiorganosiloxane domain sizes, high transparency and such high heat stability that it is hardly affected by molding conditions is thereby obtained.

When the addition rate of the above hydroxyaryl-terminated polydiorganosiloxane (II) is higher than 0.01 mole/min, the normalized dispersity of the polydiorganosiloxane domain sizes dispersed in a molded article of the obtained polycarbonate-polydiorganosiloxane copolymer exceeds 40%, thereby reducing transparency. Further, excellent transparency is not obtained according to molding conditions, or transparency tends to vary according to molding conditions.

When the addition rate of the above hydroxyaryl-terminated polydiorganosiloxane (II) is lower than 0.0001 molar equivalent/min, it is not preferred from the viewpoint of production efficiency and the content of the polydiorganosiloxane component in the obtained copolymer becomes low, whereby the molecular weight tends to vary disadvantageously. Therefore, the lower limit of the addition rate of the hydroxyaryl-terminated polydiorganosiloxane (II) is substantially 0.0001 molar equivalent/min.

The addition rate of the hydroxyaryl-terminated polydiorganosiloxane (II) is more preferably not more than 0.005 mole/min, much more preferably not more than 0.0025 mole/min, particularly preferably not more than 0.0015 mole/min based on 1 mole of the dihydric phenol (I) charged to prepare the solution. The lower limit of the addition rate is more preferably not less than 0.0002 mole/min.

To enhance uniform dispersibility, the hydroxyaryl-terminated polydiorganosiloxane (II) is desirably mixed with a solvent and injected into a mixed solution containing a terminal chloroformate compound as a solution. The concentration of the solution is desirably low as long as the reaction is not impeded, preferably 0.01 to 0.2 mole/L, more preferably 0.02 to 0.1 mole/L. Although the solvent is not particularly limited, a solvent which is the same as the solvent used in the reaction for forming the above chloroformate compound is preferred, and methylene chloride is particularly preferred.

To carry out an interfacial polycondensation reaction, the acid binder may be suitably added in consideration of the stoichiometric proportion (equivalent) of the reaction. As the acid binder may be used an alkali metal hydroxide such as sodium hydroxide or potassium hydroxide, an alkali metal carbonate such as sodium carbonate or potassium carbonate, an organic base such as pyridine, or a mixture thereof. More specifically, when the hydroxyaryl-terminated polydiorganosiloxane (II) or part of the dihydric phenol (I) as a post-addition monomer is added in this reaction stage, an alkali is preferably used in an amount of 2 equivalents or more based on the total number of moles (generally, 1 mole is equal to 2 equivalents) of the dihydric phenol (I) as the post-addition monomer and the hydroxyaryl-terminated polydiorganosiloxane (II).

The interfacial polycondensation reaction between the oligomer of the dihydric phenol (I) and the hydroxyaryl-terminated polydiorganosiloxane (II) is carried out by violently stirring the above mixed solution.

In the polycondensation reaction, a terminal capping agent or a molecular weight control agent is generally used. The terminal capping agent is a compound having a monovalent phenolic hydroxyl group, as exemplified by ordinary phenol, p-tert-butylphenol, p-cumylphenol, tribromophenol, long-chain alkyl phenols, aliphatic carboxylic acid chlorides, aliphatic carboxylic acids, hydroxy benzoic acid alkyl esters, hydroxyphenyl alkyl acid esters and alkyl ether phenols. The amount of the terminal capping agent is 100 to 0.5 mole, preferably 50 to 2 moles based on 100 moles of the total of all the dihydric phenol compounds in use. Two or more compounds may be used in combination as a matter of course.

To promote the polycondensation reaction, a catalyst such as a tertiary amine exemplified by triethylamine or a quaternary ammonium salt may be added and is preferably added. Triethylamine is particularly preferably used.

The polymerization reaction time must be relatively prolonged to improve transparency. It is preferably 30 minutes or longer, more preferably 50 minutes or longer. The upper limit of the time is preferably 2 hours or shorter, more preferably 1.5 hours or shorter from the viewpoint of production efficiency.

The polycarbonate-polydiorganosiloxane copolymer of the present invention may be obtained as a branched polycarbonate copolymer by using a branching agent in combination with the above dihydric phenol compounds. Examples of a polyfunctional aromatic compound having 3 or more aromatic groups used in the branched polycarbonate resin include phloroglucin, phloroglucide, trisphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis (4-hydroxyphenyl)ethyl]benzene}-α,α-dimethylbenzyl phenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred and 1,1,1-tris(4-hydroxyphenyl)ethane is particularly preferred.

The process of producing the branched polycarbonate copolymer may be one in which a branching agent is contained in a mixed solution during a reaction for forming a chloroformate compound, or one in which a branching agent is added during an interfacial polycondensation reaction after the end of the forming reaction. The content of a carbonate constituent unit derived from the branching agent is preferably 0.005 to 1.5 mol %, more preferably 0.01 to 1.2 mol %, particularly preferably 0.05 to 1.0 mol % based on the total weight of all the carbonate constituent units constituting the copolymer. The amount of the branched structure can be calculated by $^1$H-NMR measurement.

Although the inside pressure in the polycondensation reaction system may be reduced pressure, normal pressure or increased pressure, the polycondensation reaction can be advantageously carried out under normal pressure or the own pressure of the reaction system. The reaction temperature is selected from a range of −20 to 50° C. Since heat is generated by polymerization in many cases, water cooling or ice cooling is desirably carried out. Since the reaction time differs according to the reaction temperature and other conditions, it cannot be specified unconditionally but generally 0.5 to 10 hours.

As the case may be, a copolymer having a desired reduced viscosity $[\eta_{sp}/c]$ can be obtained by subjecting the obtained polycarbonate-polydiorganosiloxane copolymer to a suitable physical treatment (such as mixing or fractionation) and/or a chemical treatment (such as a polymer reaction, crosslinking or partial decomposition).

A polycarbonate-polydiorganosiloxane copolymer having desired purity (refining degree) can be collected by subjecting the obtained reaction product (crude product) to various known post-treatments such as separation and purification.

The polycarbonate-polydiorganosiloxane copolymer of the present invention may be mixed with a flame retardant, a reinforcing filler and a stabilizer which are mixed with a polycarbonate resin as long as the effect of the present invention is not impaired.

[Molded Article]

The copolymer of the present invention can be pelletized by melt kneading by means of an extruder such as single-screw extruder or double-screw extruder. To produce such a pellet, additives may be mixed with the copolymer.

Various products can be manufactured by injection molding the pellet which has been produced from the copolymer of the present invention as described above. The resin which has been melt kneaded by means of an extruder may be directly molded into a sheet, film, profile extrusion molded article, direct blow molded article or injection molded article without being pelletized.

Molded articles can be obtained not only by ordinary molding techniques but also by injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding according to purpose. The advantages of these molding techniques are already widely known. Both cold-runner molding and hot-runner molding techniques may be employed.

The copolymer of the present invention may be formed into a profile extrusion molded article, sheet or film by extrusion molding. Inflation, calendering and casting techniques may also be used to mold a sheet or film. Further, a specific stretching operation may be used to mold it into a heat shrinkable tube. The copolymer of the present invention can be formed into a molded article by rotational molding or blow molding.

Thereby, there is provided a molded article of the copolymer having excellent transparency. That is, according to the present invention, there is provided a molded article of a polycarbonate-polydiorganosiloxane copolymer, wherein the molded article has an aggregation structure comprising a matrix of a polycarbonate polymer and polydiorganosiloxane domains dispersed therein, the polydiorganosiloxane domains have an average size of 5 to 40 nm and a normalized dispersity of not more than 30%, and the total light transmittance is not less than 88%.

Further, a molded article of the copolymer of the present invention may be subjected to a surface treatment. The surface treatment as used herein is deposition (physical deposition, chemical deposition, etc.), plating (electroplating, electroless plating, hot dipping, etc.), painting, coating or printing, all of which are used to form a new layer on the surface layer of a resin molded article and used for ordinary polycarbonate resins. Specific examples of the surface treatment include hard coating, water-repellent and oil-repellent coating, ultraviolet light absorption coating, infrared light absorption coating and metallizing (such as deposition).

[Resin Composition and Molded Article Thereof]

The resin composition of the present invention comprises 5 to 95 wt % of an aromatic polycarbonate (component A) and 95 to 5 wt % of the above polycarbonate-polydiorganosiloxane copolymer (component B), wherein (i) the resin composition has an aggregation structure comprising a matrix of a polycarbonate polymer and polydiorganosiloxane domains dispersed therein;

(ii) the polydiorganosiloxane domains have an average size of 5 to 40 nm and a normalized dispersity of not more than 30%; and (iii) the total light transmittance is not less than 88%.

The polycarbonate-polydiorganosiloxane copolymer as the component B is as described above. In the resin composition of the present invention, the content of the component B is 95 to 5 wt %, preferably 80 to 10 wt %, more preferably 50 to 20 wt %.

The resin composition of the present invention has an aggregation structure comprising a matrix of a polycarbonate polymer and polydiorganosiloxane domains dispersed therein.

The average size of the polydiorganosiloxane domains in the resin composition of the present invention is 5 to 40 nm, preferably 5 to 15 nm, more preferably 7 to 12 nm. The lower limit of the average size is preferably 5 nm, more preferably 7 nm. The upper limit of the average size is preferably 20 nm, more preferably 15 nm, particularly preferably 12 nm.

The normalized dispersity of the polydiorganosiloxane domains in the resin composition of the present invention is not more than 30%, preferably not more than 25%, more preferably not more than 20%. The lower limit of the normalized dispersity is preferably not less than 7%, more preferably not less than 10% for practical application.

The average size and normalized dispersity of the polydiorganosiloxane domains are defined the same as the copolymer of the present invention and measured by the same methods.

The total light transmittance of the resin composition of the present invention is not less than 88%. A 2.0 mm-thick molded article formed by injection molding the resin composition of the present invention has a total light transmittance of not less than 88%. The total light transmittance is preferably not less than 88.5%, more preferably not less than 89%. The upper limit of the total light transmittance is preferably 92%, more preferably 91.5%. A 2.0 mm-thick molded article of the resin composition of the present invention preferably has a haze of 0.3 to 20%. The haze is more preferably 0.5 to 10%, more preferably 0.6 to 5%, particularly preferably 0.7 to 2%.

The total light transmittance and haze of the resin composition are defined the same as the copolymer of the present invention and measured by the same methods.

The aromatic polycarbonate (component A) is obtained by reacting a dihydric phenol with a carbonate precursor. Examples of the reaction include interfacial polycondensation, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenol, 1,1-bis(4- hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred, and bisphenol A is particularly preferred from the viewpoint of impact resistance.

In the present invention, a special polycarbonate which is produced by using another dihydric phenol may be used as the component A, besides bisphenol A type polycarbonates which are general-purpose polycarbonates.

For example, polycarbonates (homopolymers or copolymers) obtained by using 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene or 9,9-bis(4-hydroxy-3-methylphenyl)fluorene (may be abbreviated as "BCF" hereinafter) as part or all of the dihydric phenol component may be used. These polycarbonates are suitable for use in fields in which the requirements for stability to dimensional change by water absorption and form stability are very strict. The content of each of these dihydric phenols except BPA is preferably not less than 5 mol %, more preferably not less than 10 mol % based on the whole dihydric phenol component constituting the polycarbonate.

Particularly when high stiffness and excellent hydrolysis resistance are required, the component A constituting the resin composition is particularly preferably one of the following copolycarbonates (1) to (3).
(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the dihydric phenol component constituting the polycarbonate.
(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the dihydric phenol component constituting the polycarbonate.
(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the dihydric phenol component constituting the polycarbonate.

These special polycarbonates may be used alone or in combination of two or more. They may be mixed with a commonly used bisphenol A type polycarbonate.

The production processes and characteristic properties of these special polycarbonates are detailed in, for example, JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions are excellent in the hydrolysis resistance of the polymer itself and rarely warp after molding. Therefore, they are particularly preferred in fields in which form stability is required.
(i) Polycarbonates having a water absorption coefficient of 0.05 to 0.15%, preferably 0.06 to 0.13% and a Tg of 120 to 180° C., or
(ii) polycarbonates having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture percentage of a disk-like test specimen having a diameter of 45 mm and a thickness of 3.0 mm after the specimen is immersed in 23° C. water for 24 hours in accordance with ISO62-1980. Tg (glass transition temperature) is a value measured with a differential scanning calorimeter (DSC) in accordance with JIS K7121.

As the carbonate precursor is used a carbonyl halide, diester carbonate or haloformate, as exemplified by phosgene, diphenyl carbonate and dihaloformates of a dihydric phenol.

For the manufacture of an aromatic polycarbonate from a dihydric phenol and a carbonate precursor by interfacial polymerization, a catalyst, a terminal capping agent and an antioxidant for the prevention of the oxidation of the dihydric phenol may be optionally used. The aromatic polycarbonate includes a branched polycarbonate obtained by copolymerizing a polyfunctional aromatic compound having 3 or more functional groups, a polyester carbonate obtained by copolymerizing an aromatic or aliphatic (including alicyclic) bifunctional carboxylic acid, a copolycarbonate obtained by copolymerizing a bifunctional alcohol (including an alicyclic bifunctional alcohol), and a polyester carbonate obtained by copolymerizing the bifunctional carboxylic acid and the bifunctional alcohol. It may also be a mixture of two or more of the obtained aromatic polycarbonates.

The branched polycarbonate can provide drip prevention ability to the resin composition of the present invention. Examples of the polyfunctional aromatic compound having 3 or more functional groups used in the branched polycarbonate include phloroglucin, phloroglucide, trisphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of the constituent unit derived from the polyfunctional aromatic compound in the branched polycarbonate is preferably 0.01 to 2 mol %, more preferably 0.05 to 1.2 mol %, particularly preferably 0.05 to 1.0 mol % based on 100 mol % of the total of the constituent unit derived from the dihydric phenol and the constituent unit derived from the polyfunctional aromatic compound.

In the case of the melt transesterification process, a branched structure unit may be produced as a side reaction. The content of the branched structure unit is 0.001 to 2 mol %, preferably 0.005 to 1.2 mol %, particularly preferably 0.01 to 1.0 mol % based on 100 mol % of the total of it and the constituent unit derived from the dihydric phenol. The content of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

The interfacial polymerization process, melt transesterification process, carbonate prepolymer solid-phase transesterification process and cyclic carbonate compound ring-opening polymerization process all of which are processes for producing the aromatic polycarbonate (component A) are well known through documents and patent publications.

The viscosity average molecular weight (Mv) of the aromatic polycarbonate (component A) is not particularly limited but preferably $1 \times 10^4$ to $5 \times 10^4$, more preferably $1.4 \times 10^4$ to $3 \times 10^4$, much more preferably $1.4 \times 10^4$ to $2.4 \times 10^4$. Satisfactory mechanical properties are not obtained from an aromatic polycarbonate having a viscosity average molecular weight lower than $1 \times 10^4$. A resin composition obtained from an aromatic polycarbonate having a viscosity average molecular weight higher than $5 \times 10^4$ is inferior in general-applicability as it has low flowability at the time of injection molding.

The aromatic polycarbonate may be obtained by mixing an aromatic polycarbonate having a viscosity average molecular weight outside the above range. Especially an aromatic polycarbonate having a viscosity average molecular weight higher than the above range ($5 \times 10^4$) improves the entropic elasticity of a resin. As a result, it develops high moldability in gas assist molding and foam molding which may be used to mold a structural member. The moldability of the aromatic polycarbonate is improved more than that of the above branched polycarbonate. As a more preferred example, an aromatic polycarbonate (component A-1) (may be referred to as "high-molecular weight component-containing aromatic polycarbonate" hereinafter) consisting of an aromatic polycarbonate having a viscosity average molecular weight of $7 \times 10^4$ to $3 \times 10^5$ (component A-1-1) and an aromatic polycarbonate having a viscosity average molecular weight of $1 \times 10^4$ to $3 \times 10^4$ (component A-1-2) and having a viscosity average molecular weight of $1.6 \times 10^4$ to $3.5 \times 10^4$ may also be used as the component A.

In the above high-molecular weight component-containing aromatic polycarbonate (component A-1), the molecular weight of the component A-1-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-1-2 is preferably $1.0 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing aromatic polycarbonate (component A-1) can be obtained by mixing together the above components A-1-1 and A-1-2 in a ratio that ensures that a predetermined molecular weight range is obtained. The content of the component A-1-1 is preferably 2 to 40 wt %, more preferably 3 to 30 wt %, much more preferably 4 to 20 wt %, particularly preferably 5 to 20 wt % based on 100 wt % of the component A-1.

To prepare the component A-1, (1) a method in which the components A-1-1 and A-1-2 are polymerized independently and mixed together, (2) a method in which an aromatic polycarbonate showing a plurality of polymer peaks in a molecular weight distribution chart measured by GPC is produced by a method of producing the aromatic polycarbonate in the same system as typified by the method disclosed by JP-A 5-306336 to satisfy the condition of the component A-1, and (3) a method in which the aromatic polycarbonate obtained by the above manufacturing method (2) is mixed with the component A-1-1 and/or the component A-1-2 manufactured separately may be employed.

The content of the component A in the resin composition of the present invention is 5 to 95 wt %, preferably 10 to 90 wt %, more preferably 20 to 80 wt %.

The resin composition of the present invention has the same aggregation structure, the same average size and the same normalized dispersity of the domains and the same total light transmittance as those of the above polycarbonate-polydiorganosiloxane copolymer (component B).

The present invention includes a molded article formed from the resin composition.

EXAMPLES

The following examples are provided for the purpose of further illustrating the present invention but are in no way to be taken as limiting. "Parts" in the examples means parts by weight and "%" means wt % unless otherwise stated. Evaluations were made by the following methods.

(1) Viscosity Average Molecular Weight (Mv)

The specific viscosity ($\eta_{sp}$) of a solution containing 0.7 g of the copolymer dissolved in 100 ml of methylene chloride at 20° C. is first obtained from the following equation by using an Ostwald's viscometer, and the viscosity average molecular weight (M) is calculated from the obtained specific viscosity ($\eta_{sp}$) based on the following equation.

Specific viscosity $(\eta_{sp}) = (t - t_0)/t_0$

[$t_0$ is the number of seconds during which methylene chloride drops and t is the number of seconds during which the sample solution drops]

$\eta_{sp}/c = [\eta] + 0.45 \times [\eta]^2 c$ ([η] is an intrinsic viscosity)
[η]=$1.23 \times 10^{-4}$Mv$^{0.83}$
c=0.7

(2) Content of Polydiorganosiloxane Component

The $^1$H-NMR spectrum of the copolymer is measured by using the JNM-AL400 of JEOL Ltd. to calculate the content of the polydiorganosiloxane component by comparing the integral ratio of a peak derived from the dihydric phenol (I) with the integral ratio of a peak derived from the hydroxyaryl-terminated polydiorganosiloxane (II).

(3) Total Light Transmittance and Haze

The copolymer powder is kneaded at a temperature of 260° C. by means of a vented double-screw extruder (KZW15-25MG of TECHNOVEL CORPORATION) to be pelletized. After the obtained pellet is dried with hot air at 120° C. for 5 hours, it is molded into a triple plate having a width of 50 mm, a length of 90 mm and a thickness of 3.0 mm (length of 20 m), 2.0 mm (length of 45 mm) and 1.0 mm (length of 25 m) from the gate side and an arithmetic average surface roughness (Ra) of 0.03 μm by means of an injection molding machine (JSW J-75EIII of The Japan Steel Works, Ltd.) at a molding temperature of 280° C., a mold temperature of 80° C. and a molding cycle of 50 seconds.

The total light transmittance and haze of a 2.0 mm-thick portion of the triple plate are measured by using the Haze Meter NDH 2000 of Nippon Denshoku Industries Co., Ltd. in accordance with ASTM D1003.

(4) Average Size and Normalized Dispersity of Polydiorganosiloxane Domains

The average size and particle size distribution (normalized dispersity) of polydiorganosiloxane domains at an intersection which is 5 mm away from the end of a 1.0 mm-thick portion of the triple plate formed in (3) and 5 mm away from the side portion are measured by using an X-ray diffraction device (RINT-TTRII of Rigaku Corporation). An X-ray source producing a CuKα characteristic X-ray (wavelength of 0.1541841 nm) and having a tube voltage of 50 kV and a tube current of 300 mA is used. The small angle scattering optical system has a first slit of 0.03 m with an HS of 10 mm, SS of 0.2 mm and RS of 0.1 mm. The measurement is made at a FT of 0.01° step, 4 sec/step and scanning range of 0.06-3° by an asymmetric scanning method (2θ scan). The NANO-Solver (Ver. 3.3) small angle scattering analysis software of Rigaku Corporation is used for the analysis of curve fitting. The analysis is made on an isolated particle model in which interaction between particles (interference between particles) is not taken into consideration at a polycarbonate matrix density of 1.2 g/cm³ and a polydiorganosiloxane domain density of 1.1 g/cm³ based on the assumption that it has an aggregation structure comprising a matrix of a polycarbonate polymer and spherical polydiorganosiloxane domains dispersed therein and there exist variations in particle size distribution.

(5) Observation Through Transmission Electron Microscope (TEM)

A 0.5 mm-deep portion at an intersection which is 5 mm away from the end of a 1.0 mm-thick portion of the triple plate formed in (3) and 5 mm away from the side portion is cut vertically to the flow direction of a resin with a microtome (EM UC6 of Leica Microsystems Co., Ltd.) to prepare a super thin piece, and the obtained piece is adhered to a grid (EM-FINE GRID No. 2632 F-200-CU 100PC/CA of JEOL Ltd.) to be observed through JEM-2100 of JEOL Ltd. at an acceleration voltage of 200 kV.

(6) Residence Heat Stability

After the pellet obtained in (3) is heated with hot air at 120° C. for 5 hours, a triple plate formed by retaining the pellet in an injection molding machine (JSW J-75EIII of The Japan Steel Works, Ltd.) at a cylinder temperature of 300° C. for 10 minutes and a triple plate formed without retaining the pellet in the injection molding machine are prepared. The hazes of 2.0 mm-thick portions of these triple plates are measured by the Haze Meter NDH 2000 of Nippon Denshoku Industries Co., Ltd. in accordance with ASTM D1003 to measure a change in haze (Δhaze).

(7) Structural Viscosity Index (N)

Shear stress σ (Pa) with respect to shear speed D (60.8-6080 sec⁻¹) is measured at a furnace body temperature of 300° C. by using a capillary type rheometer (Capillograph 1D of Toyo Seiki Co., Ltd.) and capillary model EF (diameter: 1.0 mm, length: 10.0 mm, L/D: 10) of Toyo Seiki Co., Ltd. as a capillary in accordance with ISO11443 (JIS K7199), and a structural viscosity index (N) is obtained from the gradient of a regression line obtained by plotting these values on a double logarithmic chart. The obtained pellet which has been dried with hot air at 120° C. for 5 hours is used as a sample.

(8) Flame Retardancy

After the obtained pellet is dried with hot air at 120° C. for 5 hours, it is molded into a 3.2 mm-thick test specimen for a UL94 burn test at a cylinder temperature of 280° C. and a mold temperature of 80° C. by using an injection molding machine (JSW J-75EIII of The Japan Steel Works, Ltd,) so as to evaluate the test specimen according to a vertical burn test specified in US UL-94 standards. A test specimen which is not rated at V-0, V-1 and V-2 is designated as "notV".

The number of times of melt dripping is shown for the five test specimens.

Example 1

Step (i)

21,592 parts of ion exchange water and 3,675 parts of a 48.5% sodium hydroxide aqueous solution were fed to a reactor equipped with a thermometer, stirrer and reflux condenser, 3,897 parts (17.07 moles) of 2,2-bis(4-hydroxyphenyl)propane (bisphenol A) as the dihydric phenol (I) represented by the formula [4] and 7.6 parts of hydrosulfite were dissolved in the resulting solution, 14,565 parts (10 moles based on 1 mole of the dihydric phenol (I)) of methylene chloride was added to the obtained solution, and 1,900 parts of phosgene was blown into the reactor under agitation at 22 to 30° C. over 60 minutes. The average oligomer polymerization degree was 1.85.

Step (ii)

A solution prepared by dissolving 1,131 parts of a 48.5% sodium hydroxide aqueous solution and 108 parts of p-tert-butylphenol in 800 parts of methylene chloride was added to the above solution, and a solution prepared by dissolving 205 parts (0.067 mole) of a polydiorganosiloxane compound (X-22-1821 of Shin-Etsu Chemical Co., Ltd.) having the following structure as the dihydric phenol (II) represented by the formula [5] in 800 parts of methylene chloride was added under agitation to ensure that the addition rate of the dihydric phenol (II) became 0.0004 mole/min based on 1 mole of the dihydric phenol (I) so as to emulsify the above resulting solution and violently stirred again. 4.3 parts of triethylamine was added under agitation while the temperature of the reaction solution was 26° C. and kept stirred for 1 hour at 26 to 31° C. to terminate the reaction.

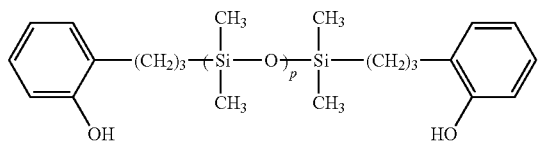

p = about 37

(Separation and Purification)

After the end of the reaction, an organic phase was separated, diluted with methylene chloride, rinsed in water, made acidic with hydrochloric acid and rinsed in water, and when the conductivity of a water phase became almost the same as that of ion exchange water, the organic phase was injected into a kneader filled with hot water to evaporate methylene chloride under agitation so as to obtain a polycarbonate-polydiorganosiloxane copolymer powder.

Figure 3:
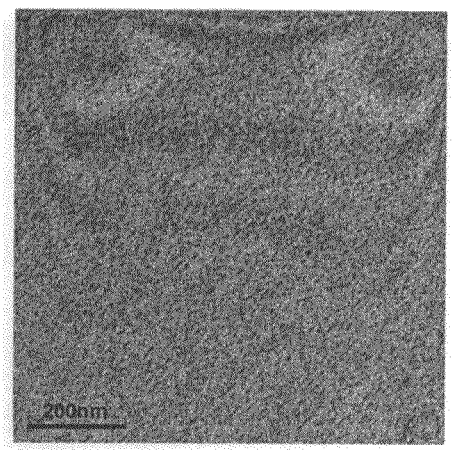
FIG. 3 is a transmission electron photomicrograph of a 1.0 mm-thick portion of a triple plate observed in Example 1 (20,000 times).

The viscosity average molecular weight of the obtained copolymer, the content of the polydiorganosiloxane component, the total light transmittance and haze of a molded article of the copolymer, the average size of the polydiorganosiloxane domains and the normalized dispersity of the polydiorganosiloxane domain sizes were measured. The small angle X-ray scattering profile (a) and the particle size distribution (b) are shown in FIG. 1. A haze change (Δhaze) by the residence test was measured. The measurement results are shown in Table 1. A transmission electron photomicrograph (TEM) (20,000 times) of a 1.0 mm-thick portion of the triple plate is shown in FIG. 3.

Example 2

The procedure of Example 1 was repeated except that 3,880 parts of 2,2-bis(4-hydroxyphenyl)propane was used and a solution prepared by dissolving 430 parts of the dihydric phenol (II) represented by the formula [5] in 1,600 parts of methylene chloride was added to ensure that the addition rate of the dihydric phenol (II) became 0.0008 mole/min based on 1 mole of the dihydric phenol (I). The average oligomer polymerization degree in the step (i) was 1.88. The measurement results are shown in Table 1.

The structural viscosity index (N) of the obtained polycarbonate-polydiorganosiloxane copolymer was 1.63. The flame retardancy rating was V-1 and the number of times of melt dripping of each of the five test specimens was 0.

Example 3

The procedure of Example 1 was repeated except that 3,860 parts of 2,2-bis(4-hydroxyphenyl)propane was used and a solution prepared by dissolving 681 parts of the dihydric phenol (II) represented by the formula [5] in 2,400 parts of methylene chloride was added to ensure that the addition rate of the dihydric phenol (II) became 0.0012 mole/min based on 1 mole of the dihydric phenol (I). The average oligomer polymerization degree in the step (i) was 1.80. The measurement results are shown in Table 1.

Example 4

The procedure of Example 1 was repeated except that 3,889 parts of 2,2-bis(4-hydroxyphenyl)propane was used and 205 parts of a polydiorganosiloxane compound having the following structure (X-22-1875 of Shin-Etsu Chemical Co., Ltd.) was used as the dihydric phenol (II) represented by the formula [5]. The average oligomer polymerization degree in the step (i) was 1.87. The measurement results are shown in Table 1.

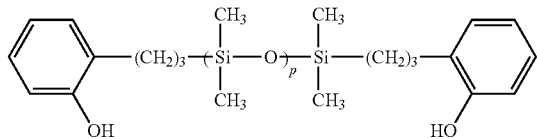

p = about 24

Example 5

The procedure of Example 4 was repeated except that 3,867 parts of 2,2-bis(4-hydroxyphenyl)propane was used and a solution prepared by dissolving 429 parts of the dihydric phenol (II) represented by the formula [5] in 1,600 parts of methylene chloride was added to ensure that the addition rate of the dihydric phenol (II) became 0.0008 mole/min based on 1 mole of the dihydric phenol (I). The average oligomer polymerization degree in the step (i) was 1.78. The measurement results are shown in Table 1.

Example 6

The procedure of Example 4 was repeated except that 3,840 parts of 2,2-bis(4-hydroxyphenyl)propane was used and a solution prepared by dissolving 678 parts of the dihydric phenol (II) represented by the formula [5] in 2,400 parts of methylene chloride was added to ensure that the addition rate of the dihydric phenol (II) became 0.0012 mole/min based on 1 mole of the dihydric phenol (I). The average oligomer polymerization degree in the step (i) was 1.85. The measurement results are shown in Table 1.

Example 7

Synthesis of Copolymer B-1

The procedure of Example 1 was repeated except that 20,387 parts (14 moles based on 1 mole of the dihydric phenol (I)) of methylene chloride was used. The average oligomer polymerization degree in the step (i) was 1.66. The measurement results are shown in Table 1.

Example 8

Synthesis of Copolymer B-2

The procedure of Example 2 was repeated except that 20,387 parts (14 moles based on 1 mole of the dihydric phenol (I)) of methylene chloride was used. The average oligomer polymerization degree in the step (i) was 1.72. The measurement results are shown in Table 1.

Comparative Example 1

Step (i)

21,592 parts of ion exchange water and 3,675 parts of a 48.5% sodium hydroxide aqueous solution were fed to a reactor equipped with a thermometer, stirrer and reflux condenser, 3,897 parts (17.07 moles) of 2,2-bis(4-hydroxyphenyl)propane (bisphenol A) as the dihydric phenol (I) represented by the formula [4] and 7.6 parts of hydrosulfite were dissolved in the resulting solution, 14,565 parts of methylene chloride was added to the obtained solution, and 1,900 parts of phosgene was blown into the reactor under agitation at 22 to 30° C. over 60 minutes.

Step (ii)

A solution prepared by dissolving 1,131 parts of a 48.5% sodium hydroxide aqueous solution and 108 parts of p-tert-butylphenol in 800 parts of methylene chloride was added to the above solution, and a solution prepared by dissolving 205 parts (0.067 mole) of the above polydiorganosiloxane compound (X-22-1821 of Shin-Etsu Chemical Co., Ltd.) as the dihydric phenol (II) represented by the formula [5] in 800 parts of methylene chloride was added under agitation to ensure that the addition rate of the dihydric phenol (II) became 0.5 mole/min based on 1 mole of the dihydric phenol (I) so as to emulsify the above resulting solution and violently stirred again. 4.3 parts of triethylamine was added under agitation while the temperature of the reaction solution was 26° C. and kept stirred for 0.5 hour at 26 to 31° C. to terminate the reaction.
(Separation and Purification)

Figure 2:
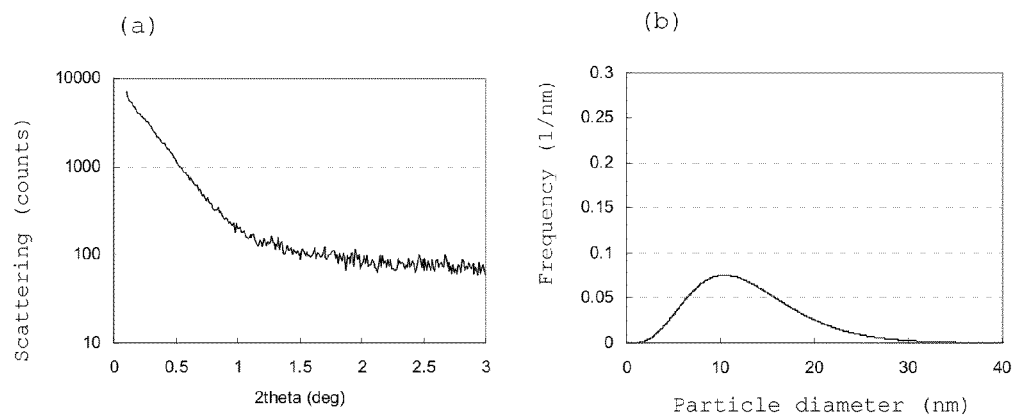
Figure 4:
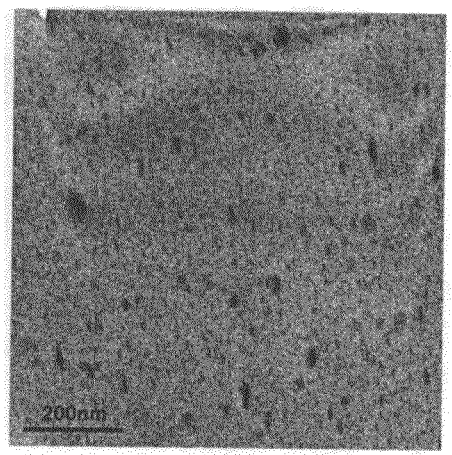
FIG. 4 is a transmission electron photomicrograph of a 1.0 mm-thick portion of a triple plate observed in Comparative Example 1 (20,000 times).

After the end of the reaction, an organic phase was separated, diluted with methylene chloride, rinsed in water, made acidic with hydrochloric acid and rinsed in water, and when the conductivity of a water phase became almost the same as that of ion exchange water, the organic phase was injected into a kneader filled with hot water to evaporate methylene chloride under agitation so as to obtain a polycarbonate-polydiorganosiloxane copolymer powder. The obtained copolymer was analyzed in the same manner as in Example 1. The measurement results are shown in Table 1. The small angle X-ray scattering profile (a) and the particle size distribution (b) of a 1.0 mm-thick portion of the triple plate are shown in FIG. 2. A transmission electron photomicrograph (TEM) (20,000 times) of the 1.0 mm-thick portion of the triple plate is shown in FIG. 4.

Comparative Example 2

The procedure of Comparative Example 1 was repeated except that 4.3 parts of triethylamine was added, and stirring was continued for 1 hour at 26 to 31° C. to terminate the reaction. The measurement results are shown in Table 1.

Comparative Example 3

Step (i)

21,592 parts of ion exchange water and 3,675 parts of a 48.5% sodium hydroxide aqueous solution were fed to a reactor equipped with a thermometer, stirrer and reflux condenser, 3,897 parts of 2,2-bis(4-hydroxyphenyl)propane (bisphenol A) as the dihydric phenol (I) represented by the formula [4] and 7.6 parts of hydrosulfite were dissolved in the resulting solution, 14,565 parts of methylene chloride was added, and 1,900 parts of phosgene was blown into the reactor under agitation at 22 to 30° C. over 60 minutes. After the reaction solution was left to stand, an organic phase was separated to obtain a methylene chloride solution of the bisphenol A oligomer.

Step (ii)

This oligomer solution was introduced into a reactor equipped with a thermometer, stirrer and reflux condenser, a solution prepared by dissolving 1,131 parts of a 48.5% sodium hydroxide aqueous solution and 108 parts of p-tert-butylphenol in 800 parts of methylene chloride was added to the above solution, and a solution prepared by dissolving 205 parts by weight of the above polydiorganosiloxane compound (X-22-1821 of Shin-Etsu Chemical Co., Ltd.) as the dihydric phenol (II) represented by the formula [5] in 800 parts of methylene chloride was added under agitation to ensure that the addition rate of the dihydric phenol (II) became 0.5 mole/min based on 1 mole of the dihydric phenol (I) so as to emulsify the above resulting solution and violently stirred again. 4.3 parts of triethylamine was added under agitation while the temperature of the reaction solution was 26° C. and kept stirred for 1 hour at 26 to 31° C. to terminate the reaction.
(Separation and Purification)

After the end of the reaction, an organic phase was separated, diluted with methylene chloride, rinsed in water, made acidic with hydrochloric acid and rinsed in water, and when the conductivity of a water phase became almost the same as that of ion exchange water, the organic phase was injected into a kneader filled with hot water to evaporate methylene chloride under agitation so as to obtain a polycarbonate-polydiorganosiloxane copolymer powder. The obtained copolymer was analyzed in the same manner as in Example 1. The measurement results are shown in Table 1.

Comparative Example 4

Reaction

In accordance with the method described in JP-A 4-202466, 21,592 parts of ion exchange water and 3,675 parts of a 48.5% sodium hydroxide aqueous solution were fed to a reactor equipped with a thermometer, stirrer and reflux condenser, 3,897 parts (17.07 moles) of 2,2-bis(4-hydroxyphenyl)propane (bisphenol A) as the dihydric phenol (I) represented by the formula [4], 205 parts (0.067 part) of the above polydiorganosiloxane compound (X-22-1821 of Shin-Etsu Chemical Co., Ltd.) as the dihydric phenol (II) represented by the formula [5] and 7.6 parts of hydrosulfite were dissolved in the resulting solution, 14,565 parts of methylene chloride was added, and 1,900 parts of phosgene was blown into the reactor under agitation at 22 to 30° C. over 60 minutes. A solution prepared by dissolving 1,131 parts of a 48.5% sodium hydroxide aqueous solution and 108 parts of p-tert-butylphenol in 800 parts of methylene chloride was added to emulsify the above resulting solution and violently stirred again. 4.3 parts of triethylamine was added under agitation while the temperature of the reaction solution was 26° C. and kept stirred for 1 hour at 26 to 31° C. to terminate the reaction.
(Separation and Purification)

After the end of the reaction, an organic phase was separated, diluted with methylene chloride, rinsed in water, made acidic with hydrochloric acid and rinsed in water, and when the conductivity of a water phase became almost the same as that of ion exchange water, the organic phase was injected into a kneader filled with hot water to evaporate methylene chloride under agitation so as to obtain a polycarbonate-polydiorganosiloxane copolymer powder. The obtained copolymer was analyzed in the same manner as in Example 1. The measurement results are shown in Table 1.

In images (FIGS. 3 and 4) observed through a transmission electron microscope (TEM), dark points correspond to polydiorganosiloxane domains. A particle size distribution actually measured from the TEM observation images and a particle size distribution analyzed from a small angle X-ray scattering profile have a good correlation. That is, it is obvious that the small angle X-ray scattering measurement is effective as a method of measuring the average size and normalized dispersity of polydiorganosiloxane domains accurately and easily with high reproducibility.

A molded article of the polycarbonate-polysiloxane copolymer of the present invention has a high total light transmittance, reduced haze and high transparency as the reduction of transparency by residence is suppressed. This clearly demonstrates that transparency is improved by optimizing the average size and normalized dispersity of polydiorganosiloxane domains.

Comparative Example 5

Synthesis of Copolymer B-3

The procedure of Example 8 was repeated except that a methylene chloride solution of the dihydric phenol (II) was added to ensure that the addition rate of the dihydric phenol (II) became 0.1 mole/min based on 1 mole of the dihydric phenol (I). The measurement results are shown in Table 1.

Comparative Example 6

Synthesis of Copolymer B-4

Reaction

In accordance with the method described in JP-A 4-202466, 21,592 parts of ion exchange water and 3,675 parts of a 48.5% sodium hydroxide aqueous solution were fed to a reactor equipped with a thermometer, stirrer and reflux condenser, 3,897 parts (17.07 moles) of 2,2-bis(4-hydroxyphenyl)propane (bisphenol A) as the dihydric phenol (I) represented by the formula [4], 430 parts (0.14 mole) of the above polydiorganosiloxane compound (X-22-1821 of Shin-Etsu Chemical Co., Ltd.) as the dihydric phenol (II) represented by the formula [5] and 7.6 parts of hydrosulfite were dissolved in the resulting solution, 20,387 parts of methylene chloride was added to the obtained solution, and 1,900 parts of phosgene was blown into the reactor under agitation at 22 to 30° C. over 60 minutes.

A solution prepared by dissolving 1,131 parts of a 48.5% sodium hydroxide aqueous solution and 108 parts of p-tert-butylphenol in 800 parts of methylene chloride was added to emulsify the above resulting solution and violently stirred again. 4.3 parts of triethylamine was added under agitation while the temperature of the reaction solution was 26° C. and kept stirred for 1 hour at 26 to 31° C. to terminate the reaction.

(Separation and Purification)

After the end of the reaction, an organic phase was separated, diluted with methylene chloride, rinsed in water, made acidic with hydrochloric acid and rinsed in water, and when the conductivity of a water phase became almost the same as that of ion exchange water, the organic phase was injected into a kneader filled with hot water to evaporate methylene chloride under agitation so as to obtain a copolymer powder. The measurement results are shown in Table 1.

TABLE 1

| | Viscosity average molecular weight | Content of polydiorgano-siloxane component (wt %) | Average size of polydiorgano-siloxane domains (nm) | Normalized dispersity (%) | Total light transmittance (%) | Haze (%) | Δ Haze (%) |
|---|---|---|---|---|---|---|---|
| Ex. 1 | 19,600 | 4.1 | 9.6 | 19.1 | 88.4 | 1.5 | 0.2 |
| Ex. 2 | 20,100 | 8.4 | 10.4 | 23.5 | 88.2 | 1.9 | 0.2 |
| Ex. 3 | 20,000 | 12.6 | 11.1 | 24.2 | 88.5 | 1.7 | 0.4 |
| Ex. 4 | 19,100 | 3.9 | 7.7 | 21.6 | 90.2 | 1.5 | 0.2 |
| Ex. 5 | 18,700 | 8.0 | 7.4 | 23.0 | 90.3 | 1.8 | 0.3 |
| Ex. 6 | 18,600 | 12.2 | 7.4 | 20.1 | 90.0 | 1.4 | 0.2 |
| Ex. 7 | 19,400 | 4.1 | 9.4 | 18.9 | 89.6 | 0.8 | 0.1 |
| Ex. 8 | 19,100 | 8.4 | 9.9 | 19.2 | 89.6 | 1.1 | 0.1 |
| C. Ex. 1 | 20,200 | 4.1 | 13.0 | 44.5 | 61.5 | 39.4 | 9.3 |
| C. Ex. 2 | 19,700 | 4.1 | 10.9 | 30.3 | 77.6 | 8.1 | 5.8 |
| C. Ex. 3 | 19,800 | 4.2 | 11.3 | 32.8 | 78.0 | 8.4 | 4.2 |
| C. Ex. 4 | 21,200 | 3.8 | 11.8 | 40.4 | 69.0 | 19.6 | 5.0 |
| C. Ex. 5 | 19,800 | 8.3 | 11.1 | 29.9 | 82.5 | 4.6 | 3.2 |
| C. Ex. 6 | 20,700 | 8.2 | 11.6 | 36.2 | 75.7 | 10.6 | 4.6 |

Ex.: Example
C. Ex.: Comparative Example

Examples 9 to 15 and Comparative Examples 7 to 10

Resin Compositions

Components shown in Table 2 were mixed together in a ratio shown in Table 2 by means of a blender, and the resulting mixture was melt kneaded by means of a vented double-screw extruder (KZW15-25 MG of TECHNOVEL CORPORATION) to obtain a pellet. The extrusion conditions include a delivery rate of 2.5 kg/h, a screw revolution of 250 rpm, and an extrusion temperature from the first feed port to the die portion of 260° C. The evaluation results of the obtained pellets are shown in Table 2.

Figure 5:
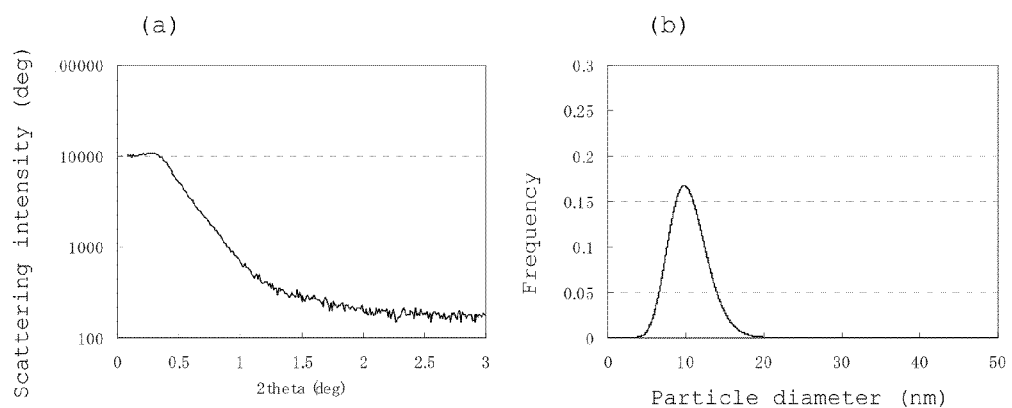
Figure 6:
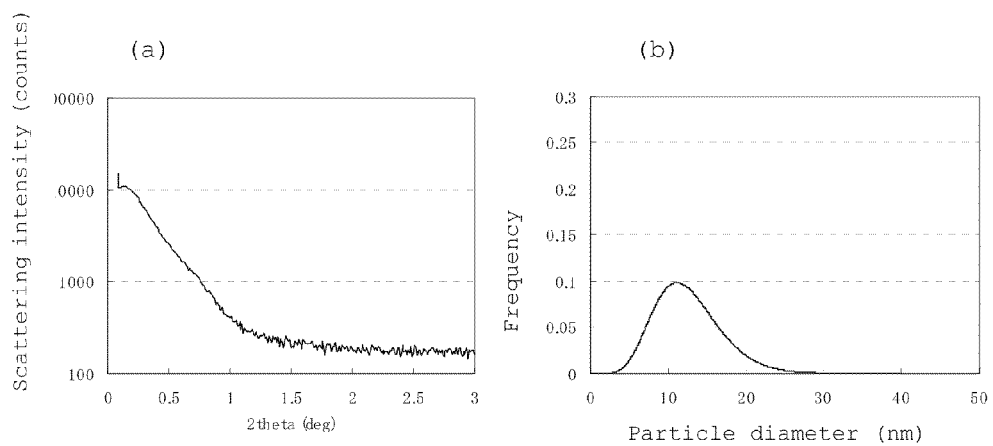

The small angle X-ray scattering profile (a) and particle size distribution (b) of a 1.0 mm-thick portion of the triple plate measured in Example 12 are shown in FIG. 5. The small angle X-ray scattering profile (a) and particle size distribution (b) of a 1.0 mm-thick portion of the triple plate measured in Comparative Example 7 are shown in FIG. 6.

Symbols in Table 2 denote the following components.
(Component A)
A-1: linear aromatic polycarbonate resin powder synthesized from bisphenol A, p-tert-butylphenol as a terminal capping agent and phosgene by interfacial polycondensation (Panlite L-1250WP of Teijin Chemicals Ltd., viscosity average molecular weight of 23,900)
A-2: linear aromatic polycarbonate resin powder synthesized from bisphenol A, p-tert-butylphenol as a terminal capping agent and phosgene by interfacial polycondensation (Panlite L-1225WX of Teijin Chemicals Ltd., viscosity average molecular weight of 19,700)
A-3: linear aromatic polycarbonate resin powder synthesized from bisphenol A, p-tert-butylphenol as a terminal capping agent and phosgene by interfacial polycondensation (Panlite CM-1000 of Teijin Chemicals Ltd., viscosity average molecular weight of 16,000)

(Component B)
B-1: polycarbonate-polydiorganosiloxane copolymer synthesized in Example 7
B-2: polycarbonate-polydiorganosiloxane copolymer synthesized in Example 8
B-3: polycarbonate-polydiorganosiloxane copolymer synthesized in Comparative Example 5
B-4: polycarbonate-polydiorganosiloxane copolymer synthesized in Comparative Example 6

INDUSTRIAL FEASIBILITY

The polycarbonate-polydiorganosiloxane copolymer obtained by the present invention can be used in parts in which the polycarbonate-polydiorganosiloxane copolymer of the prior art could not be used, making use of its characteristics properties as polydiorganosiloxane domains form a specific aggregation structure in its molded product and the copolymer has high transparency, excellent impact resistance

TABLE 2

| Composition | | | Unit | Ex. 9 | Ex. 10 | Ex. 11 | Ex. 12 | Ex. 13 | Ex. 14 | Ex. 15 |
|---|---|---|---|---|---|---|---|---|---|---|
| Composition | Component A | A-1 | Parts by weight | | | | | | 50 | |
| | | A-2 | | 50 | 90 | 75 | 50 | 10 | | |
| | | A-3 | | | | | | | | 50 |
| | Component B | B-1 | Parts by weight | 50 | | | | | | |
| | | B-2 | | | 10 | 25 | 50 | 90 | 50 | 50 |
| | | B-3 | | | | | | | | |
| | | B-4 | | | | | | | | |
| Evaluyation results | Viscosity average molecular weight | | — | 19,500 | 19,700 | 19,900 | 19,800 | 19,300 | 21,900 | 18,100 |
| | Content of polydiorgano-siloxane component | | wt % | 2.1 | 0.7 | 2.4 | 4.2 | 7.6 | 4.2 | 4.1 |
| | Average size of polydiorgano-siloxane domains | | nm | 9.6 | 10.9 | 10.7 | 10.4 | 10.3 | 10.5 | 10.1 |
| | Normalized dispersity | | % | 19.6 | 21.0 | 21.1 | 20.6 | 20.2 | 20.9 | 20.2 |
| | Total light transmittance | | % | 89.5 | 88.5 | 88.5 | 88.7 | 89.1 | 88.6 | 89.0 |
| | Haze(%) | | % | 0.9 | 1.4 | 1.7 | 1.4 | 1.3 | 1.4 | 1.2 |
| | ΔHaze | | % | 0.1 | 0.4 | 0.5 | 0.3 | 0.3 | 0.3 | 0.2 |
| | | | Unit | C. Ex. 7 | C. Ex. 8 | C. Ex. 9 | C. Ex. 10 | | | |
| Composition | Component A | A-1 | Parts by weight | | | | | | | |
| | | A-2 | | 50 | 50 | | | | | |
| | | A-3 | | | | | | | | |
| | Component B | B-1 | Parts by weight | | | | | | | |
| | | B-2 | | | | | | | | |
| | | B-3 | | 50 | | 100 | | | | |
| | | B-4 | | | 50 | | 100 | | | |
| Evaluyation results | Viscosity average molecular weight | | — | 19,900 | 20,100 | 19,800 | 20,700 | | | |
| | Content of polydiorgano-siloxane component | | wt % | 4.1 | 4.0 | 8.3 | 8.2 | | | |
| | Average size of polydiorgano-siloxane domains | | nm | 11.4 | 12.1 | 11.1 | 11.6 | | | |
| | Normalized dispersity | | % | 34.1 | 41.0 | 29.9 | 36.2 | | | |
| | Total light transmittance | | % | 82.8 | 71.8 | 82.5 | 75.7 | | | |
| | Haze(%) | | % | 5.5 | 16.0 | 4.6 | 10.6 | | | |
| | ΔHaze | | % | 4.0 | 5.2 | 3.2 | 4.6 | | | |

Ex.: Example
C. Ex.: Comparative Example

EFFECT OF THE INVENTION

Since the polycarbonate-polysiloxane copolymer of the present invention and a resin composition thereof have high transparency, high flame retardancy and excellent heat stability, they can provide a molded article having a high total light transmittance and high transparency with a reduced haze stably without being affected by molding conditions. The molded article of the present invention has a high total light transmittance and a low haze. According to the production process of the present invention, the above copolymer can be manufactured.

and high flame retardancy. More specifically, it can be widely used in such fields as optical parts, electric and electronic equipment and automobiles. Much more specifically, it can be used in various optical disks such as optical disks and associated members, housing moldings such as battery housings, mirror cylinders, memory cards, speaker cones, disk cartridges, surface emitting materials, micro-machine mechanical parts, hinged molded articles, molded articles for hinges, light transmitting and guide buttons, and touch panel parts.

The invention claimed is:
1. A process of manufacturing a polycarbonate-polydiorganosiloxane copolymer comprising a polycarbonate block represented by the following formula [1] and a polydiorganosiloxane block represented by the following formula [3], wherein (i) the copolymer has an aggregation structure comprising a matrix of the polycarbonate and polydiorganosiloxane domains dispersed therein;

(ii) the polydiorganosiloxane domains have an average size of 5 to 15 nm and a normalized dispersity of not more than 25%;

(iii) a total light transmittance is not less than 88%; and (iv) a 2.0 mm-thick molded article obtained with the polycarbonate-polydiorganosiloxane copolymer has a haze of 0.7 to 2%,

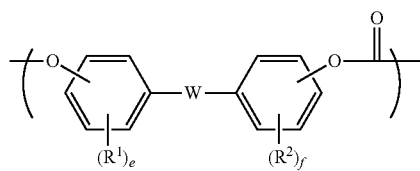
[1]

wherein $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, with the proviso that when there are a plurality of $R^1$'s and a plurality of $R^2$'s, they may be the same or different, e and f are each an integer of 1 to 4, and W is a single bond or at least one group selected from the group consisting of groups represented by the following formulas [2],

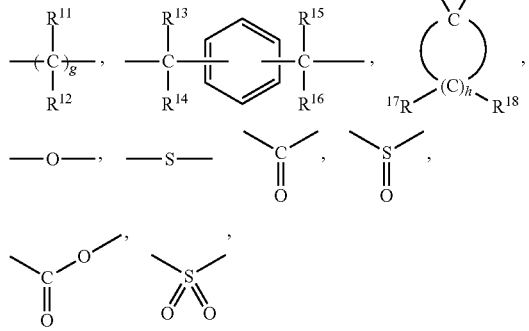
[2]

wherein $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms, g is an integer of 1 to 10, and h is an integer of 4 to 7,

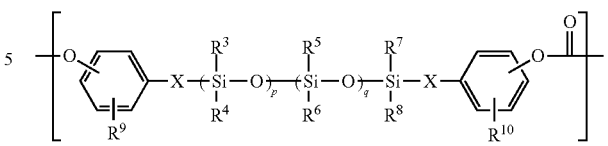
[3]

wherein $R^3$, $R^4$, $R^5$, $R^6$, $R^7$ and $R^8$ are each independently a hydrogen atom, alkyl group having 1 to 12 carbon atoms, or substituted or non-substituted aryl group having 6 to 12 carbon atoms, $R^9$ and $R^{10}$ are each independently a hydrogen atom, halogen atom, alkyl group having 1 to 10 carbon atoms, or alkoxy group having 1 to 10 carbon atoms, p is a natural number, q is 0 or a natural number, (p+q) is a natural number of less than 100, and X is a divalent aliphatic group having 2 to 8 carbon atoms, the process comprising the steps of:

(i) reacting a dihydric phenol (I) represented by the following formula [4] with phosgene in a mixed solution of a water-insoluble organic solvent and an alkaline aqueous solution to prepare a solution containing a carbonate oligomer having a terminal chloroformate group:

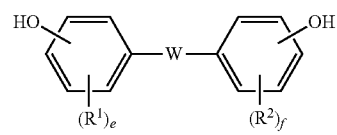
[4]

wherein $R^1$, $R^2$, e, f and W are as defined above; and (ii) adding a hydroxyaryl-terminated polydiorganosiloxane (II) represented by the following formula [5] at a rate of 0.0002 to 0.0015 mole/min based on 1 mole of the dihydric phenol (I) charged to prepare the solution while the solution is stirred to carry out interfacial polycondensation of the hydroxyaryl-terminated polydiorganosiloxane (II) and the carbonate oligomer:

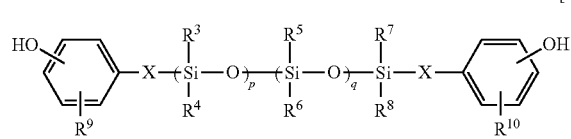
[5]

wherein $R^3$, $R^4$, $R^5$, $R^6$, $R^7$, $R^8$, $R^9$, $R^{10}$, p, q and X are as defined above.

2. The production process according to claim 1, wherein the water-insoluble organic solvent is used in an amount of not less than 12 moles based on 1 mole of the dihydric phenol (I) represented by the formula [4].

3. The process according to claim 1, wherein the polydiorganosiloxane block represented by the formula [3] is derived from a (2-allylphenol)-terminated polydiorganosiloxane or a (2-methoxy-4-allylphenol)-terminated polydiorganosiloxane.

4. The process according to claim 1, wherein (p+q) in the formula [3] is 5 to 70.

5. The process according to claim 1, wherein (p+q) in the formula [3] is 30 to 60 and the total light transmittance is not less than 89%.

6. The process according to claim 1, wherein a content of the polydiorganosiloxane block represented by the formula [3] is 0.1 to 50 wt % based on a total weight of the copolymer.

7. The process according to claim 1, wherein $R^3$, $R^4$, $R^5$, $R^6$, $R^7$ and $R^8$ are all methyl groups.

8. The process according to claim 1, wherein the copolymer has a viscosity average molecular weight of $1.60 \times 10^4$ to $2.20 \times 10^4$ and a structural viscosity index (N) of 1.55 to 1.80.

9. The process according to claim 1, wherein the polycarbonate block represented by the formula [1] is derived from 2,2-bis(4-hydroxyphenyl)propane.

\* \* \* \* \*